Nov. 2, 1943.   O. E. FISHBURN   2,333,165
TRANSMISSION SYNCHRONIZING MECHANISM
Filed Dec. 20, 1937   6 Sheets-Sheet 1

INVENTOR.
Otto E. Fishburn.
BY Harness, Dind, Palee & Harris
ATTORNEYS.

Nov. 2, 1943.   O. E. FISHBURN   2,333,165
TRANSMISSION SYNCHRONIZING MECHANISM
Filed Dec. 20, 1937   6 Sheets-Sheet 2
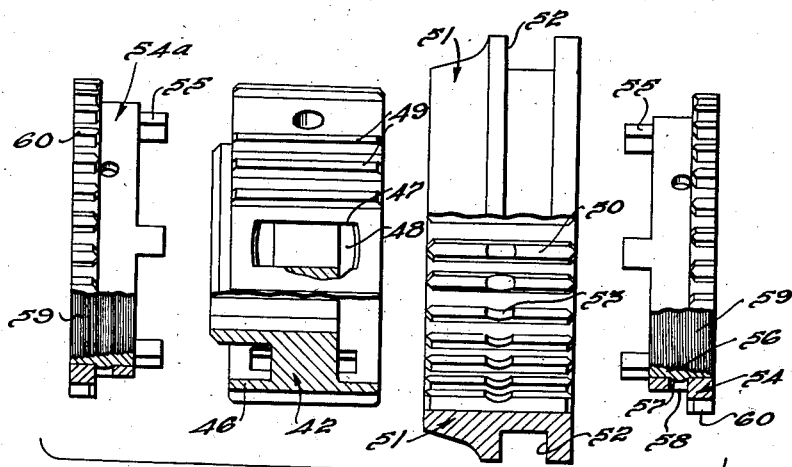
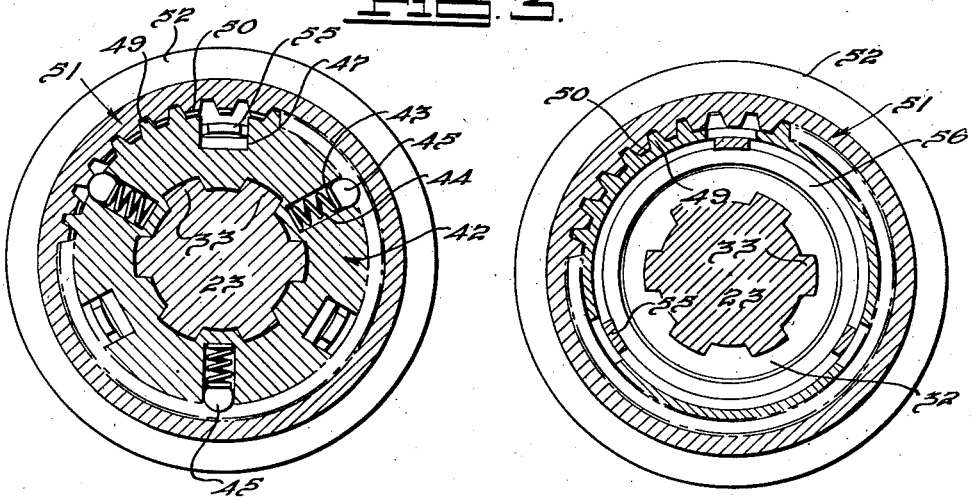
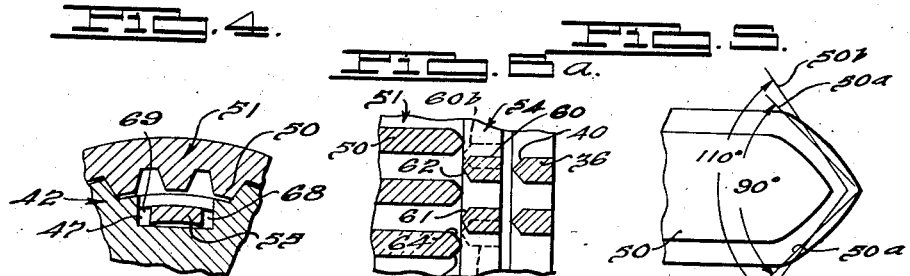
INVENTOR.
Otto E. Fishburn.
BY
ATTORNEYS.

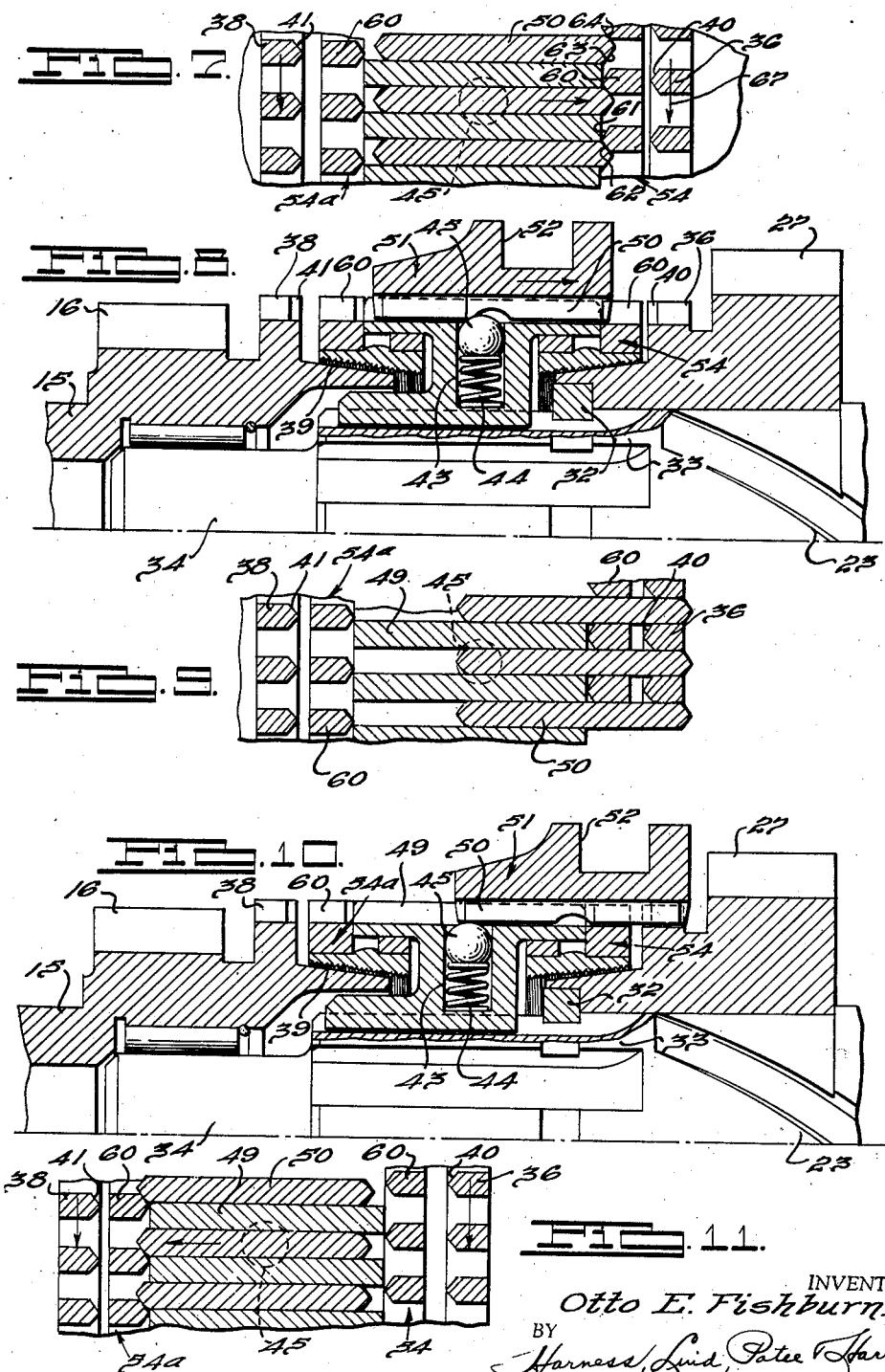

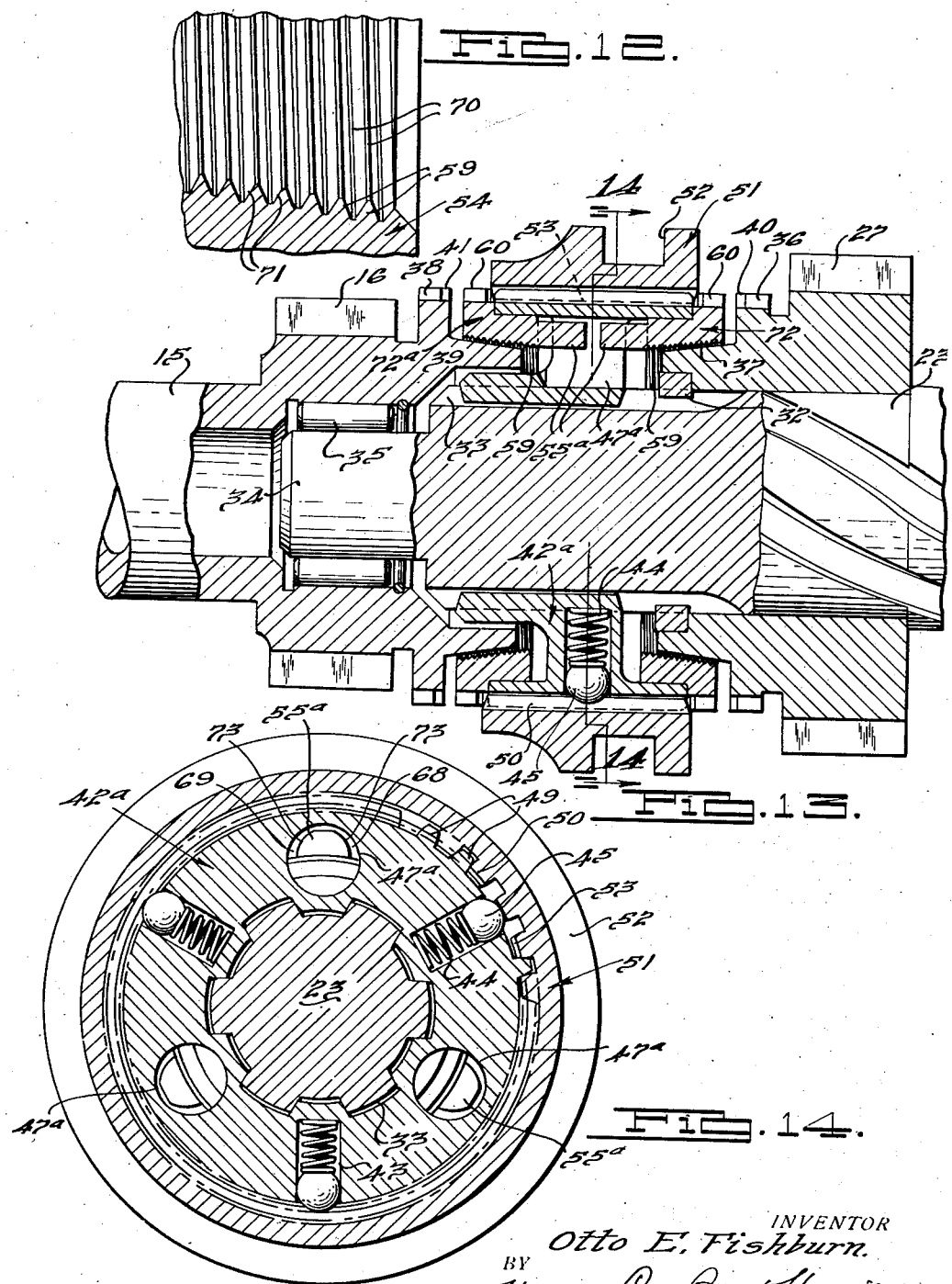

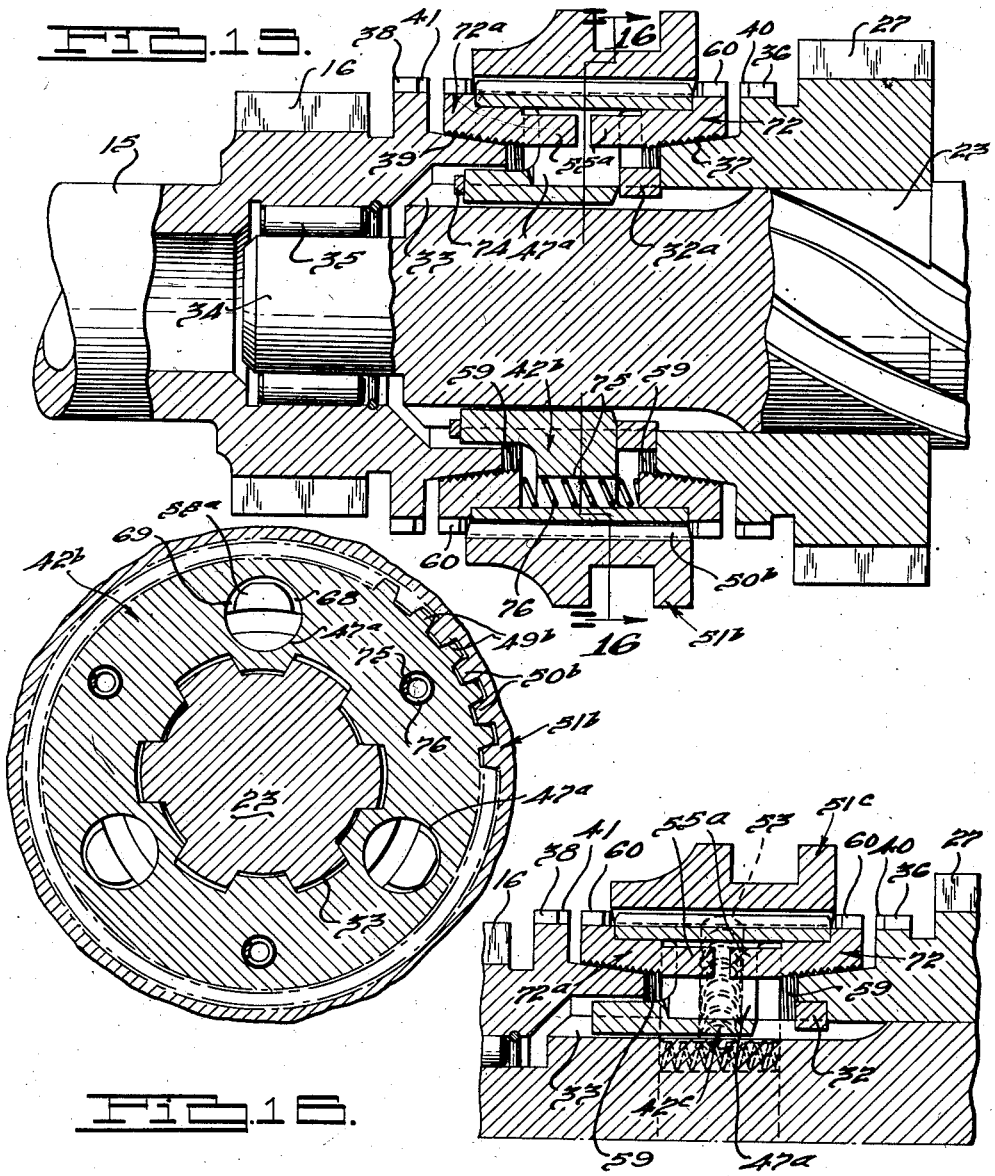

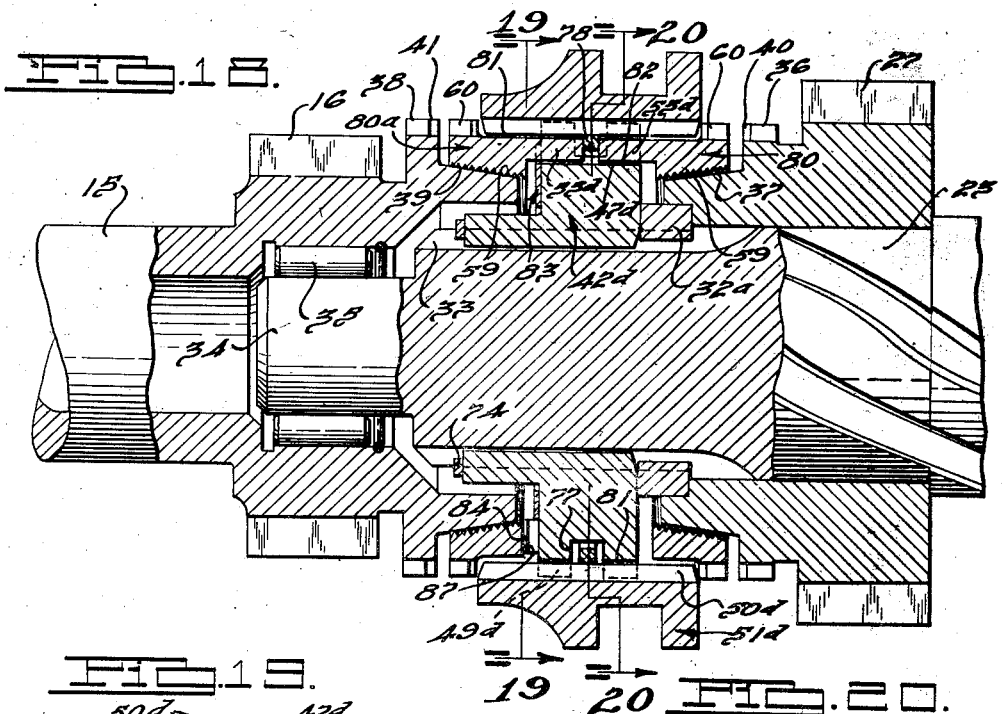
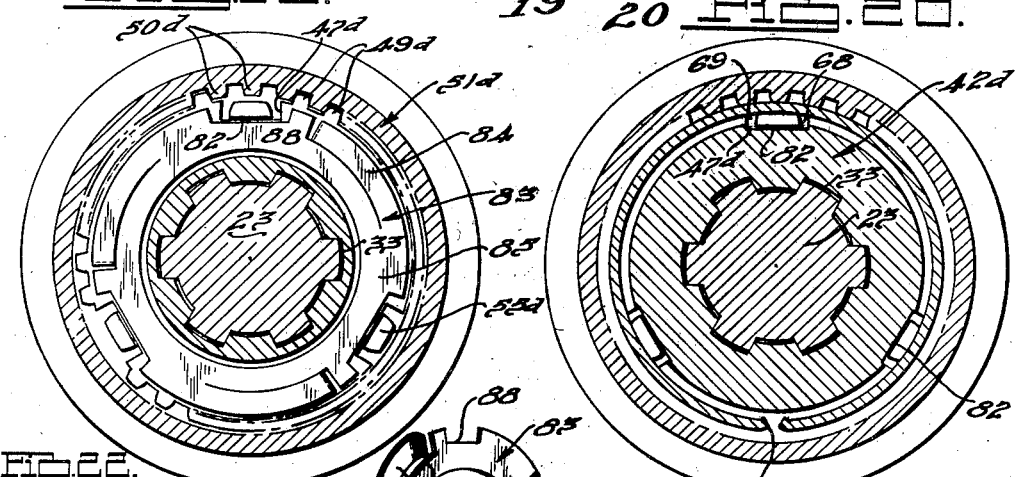
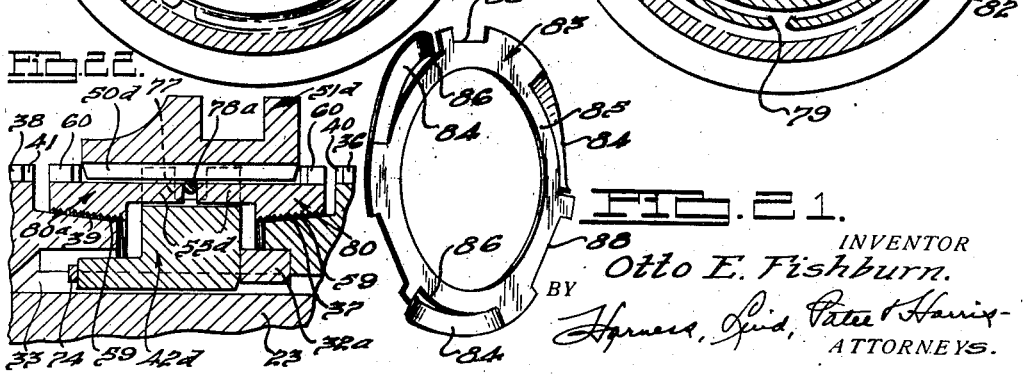

Patented Nov. 2, 1943

2,333,165

UNITED STATES PATENT OFFICE 2,333,165

TRANSMISSION SYNCHRONIZING MECHANISM

Otto E. Fishburn, Detroit, Mich., assignor to Chrysler Corporation, Highland Park, Mich., a corporation of Delaware Application December 20, 1937, Serial No. 180,840

56 Claims. (Cl. 192—53)

This invention relates to motor vehicle transmissions and refers more particularly to improvements in synchromesh mechanisms for use with such transmissions.

This application is a continuation in part of my copending application Serial No. 108,123, filed October 29, 1936, now abandoned.

One object of my invention is to provide an improved means for synchronizing the speeds of shafts preparatory to positively clutching the shafts together, such means being of a positive character and of a simple construction capable of long use without undue wear.

Another object of my invention is to provide a synchronizing device which will insure against clashing of the shiftable clutch teeth and which operates in a minimum of time to control the rotative speeds of the parts to be clutched; also which requires very little effort to operate the synchronizing parts in manipulating the transmission.

An additional object is to provide an improved synchromesh mechanism which is positive in its control of the synchronizing parts and which has a servo or self-energizing action in controlling the speed ratio changing mechanism; also an improved synchronizing mechanism which is bidirectional in its control of the parts to be clutched regardless of which of these parts has the faster rotation at the start of the clutching action.

A further object of my invention is to provide an improved synchromesh mechanism for transmission gearing incorporating means to brake the spin of the main clutch driven parts when the main clutch is disengaged, thereby facilitating changes in the settings of the transmission including changes which do not have a synchromesh mechanism especially provided therefor.

Further objects and advantages of my invention will be apparent from the following description of several embodiments of my invention, reference being had to the accompanying drawings in which:

Fig. 3 is an exploded view of the shiftable synchromesh parts with portions broken away to illustrate the interior structure.

Fig. 4 is a sectional elevational view taken along line 4—4 of Fig. 2.

Fig. 5 is a sectional elevational view taken along line 5—5 of Fig. 2.

Fig. 6 is a fragementary sectional view along line 6—6 of Fig. 2.

Fig. 6A is a detailed sectional view taken along line 6A—6A of Fig. 2, the opposite movements of one of the synchronizing ring teeth being shown in dotted lines.

Fig. 6B is an enlarged plan view of an end of the teeth of the shift collar.

Fig. 7 is a top plan view of the synchromesh parts in their Fig. 8 positions, the teeth of the shiftable collar being shown in cross section.

Fig. 8 is a sectional elevational view of the synchromesh parts positions during the synchromesh engagement of second speed ratio.

Fig. 9 is a view corresponding to Fig. 7 with the parts fully engaged for second speed ratio drive.

Fig. 10 is a view corresponding to Fig. 8 but showing the parts positioned as in Fig. 9.

Fig. 11 is a view corresponding to Fig. 7 but illustrating the parts during the opposite shift movement of the collar for shifting into the direct drive.

Fig. 12 is an enlarged fragmentary sectional view of one of the friction cups as seen at the extreme right of Fig. 3.

Fig. 13 is a view generally corresponding to Fig. 2 but illustrating a slightly modified form of my invention.

Fig. 14 is a sectional elevational view taken as indicated by line 14—14 of Fig. 13.

Fig. 15 is a view generally corresponding to Figs. 2 and 13 but illustrating a further modification of my invention.

Fig. 16 is a sectional elevational view taken as indicated by line 16—16 of Fig. 15.

Fig. 17 is a fragmentary sectional elevational view showing a still further modification of my invention.

Fig. 18 is a view generally corresponding to Figs. 2, 13 and 15 but showing an additional embodiment of my invention.

Figs. 19 and 20 are sectional elevational views taken respectively as indicated by lines 19—19 and 20—20 of Fig. 18.

Fig. 21 is a perspective view of the spreader spring illustrated in Fig. 18.

Fig. 22 is a fragementary view of a portion of the Fig. 18 synchromesh mechanism but illustrating another form of expansion ring.

Figure 1:
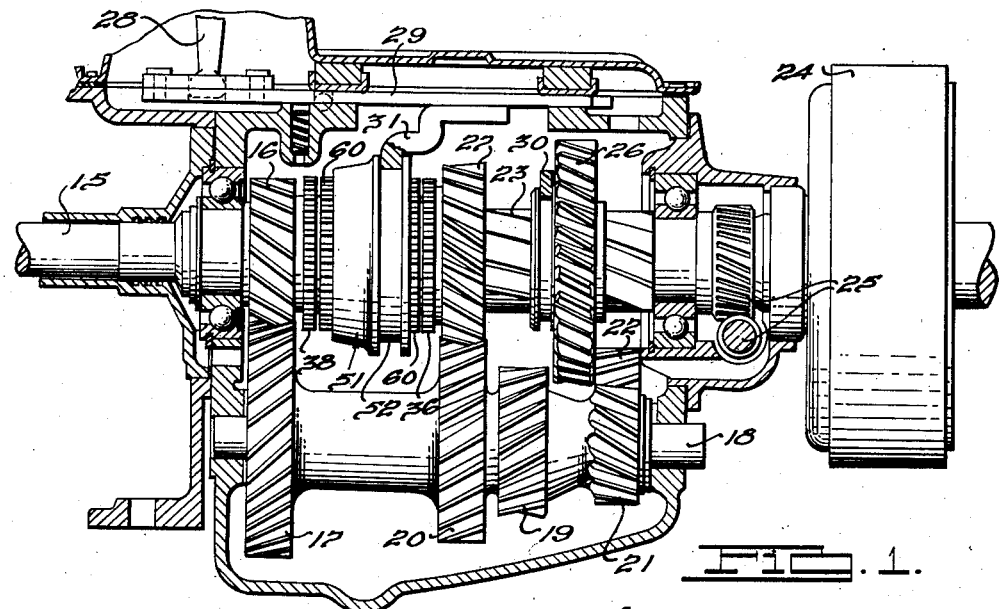
Fig. 1 is a sectional elevational view through my transmission illustrating my synchromesh mechanism for the second and direct driving ratios.

Referring to the drawings, I have illustrated my synchronizing mechanism in connection with a motor vehicle transmission now in general use although I desire to point out that my improvements are applicable to other transmission arrangements and generally where it is desired to synchronize and drivingly couple a pair of rotating members. The conventional transmission illustrated in Fig. 1 comprises a driving shaft 15 which is adapted to be driven by the usual engine, preferably through the medium of the well known main clutch, the engine and clutch not being illustrated in my drawings as they may be of any well known form and arrangement such as now used in motor vehicles.

The driving shaft 15 carries the main or primary driving gear 16 for rotation therewith, this gear being in constant mesh with the gear 17 of the countershaft gear cluster mounted for rotation on the countershaft 18. This gear cluster, according to well known practice, comprises a low speed gear 19, a second speed gear 20, and a reverse gear 21 which is in constant mesh with the reverse idler gear 22. The transmission driven shaft 23 extends rearwardly to drive the ground wheels of the vehicle, the usual propeller shaft brake being illustrated at 24 and the speedometer driving gears being illustrated at 25.

The driven shaft 23 has mounted thereon the low speed and reverse gear 26 splined to the driven shaft for selective meshing with the countershaft low speed gear 19 or the reverse idler gear 22 for respectively transmitting a low speed drive to the driven shaft 23 or the drive thereto in a reverse direction. Freely rotatable on shaft 23 is the second speed or secondary gear 27 in constant mesh with the countershaft gear 20, the principles of my invention being illustrated in connection with improved means for selectively drivingly connecting gears 16 and 27 with the driven shaft 23 for respectively transmitting thereto a direct drive or the second speed ratio drive as will be presently more apparent. The transmission drives may be controlled generally according to customary practice by manual manipulation of the usual gear shift lever 28 selectively engageable with the sliding rail mechanism 29 for actuating the yokes 30 and 31 to control the drives to gear 26 and the drives in second and direct speeds.

Figure 2:
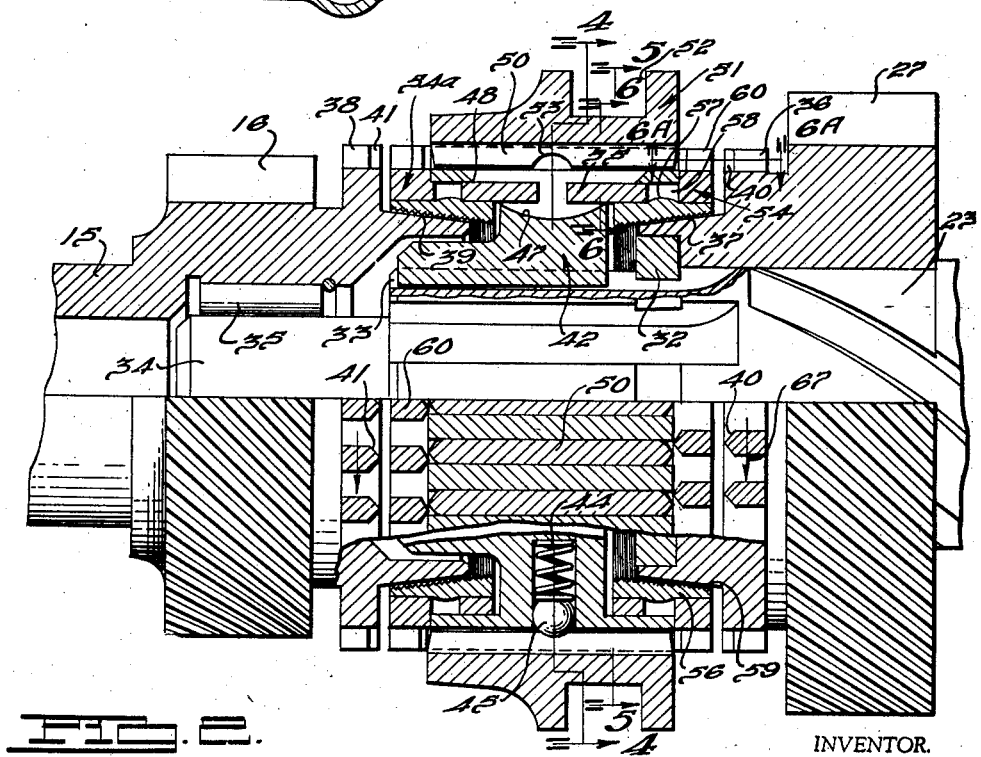
Fig. 2 is an enlarged sectional elevational view of the synchromesh mechanism, a portion of the structure being in elevation.

Referring particularly to Fig. 2, the driven shaft 23 carries the usual splined ring 32 which prevents forward displacement of the driving gear 27 and forwardly adjacent this ring, shaft 23 is formed with splines 33 and a forward end portion 34 rotatably piloted by the roller bearing 35 within the rearwardly overhanging portion of the driving shaft 15 and gear 16. The gear 27 drivingly carries a set of circumferentially arranged external clutching teeth 36 and one element of a synchronizing friction clutch preferably in the form of a cone 37. For convenience of manufacture it is preferred to form the driving cone 37 and clutch teeth 36 integrally with the body portion of gear 27. In similar manner, the gear 16 drivingly carries the corresponding set of clutching teeth 38 and the driving cone 39. The forwardly extending edges of teeth 36 are bevelled or tapered at 40 and the rear edges of teeth 38 are correspondingly formed at 41.

Mounted on the splines 33 for rotation with shaft 23 and for shifting movement axially thereof is the synchronizing clutching mechanism comprising the following cooperating structural parts. A synchronizing hub 42 engages the splines 33, this hub being formed with a plurality of circumferentially spaced outwardly opening pockets 43, each of which receives a spring 44 yieldingly urging a ball detent 45 outwardly from the rim portion 46 of the hub. This rim portion axially overhangs the radially extending body portion of the hub in opposite directions and circumferentially between adjacent pockets 43 I have formed the concave recesses or apertures 47. These recesses may be conveniently formed by a rotary cutting tool, it being noted that each recess 47 is sufficiently deep to cut through the rim portion 46 at the junctures of the body portion 42 thereby forming the oppositely extending openings or slideways at 48. Circumferentially of the rim portion 46 between each of the pockets 43 and the recesses 47, the rim portion is provided with a plurality of axially extending splines 49 adapted to receive the circumferentially extending set of internal clutching teeth 50 carried by the shiftable synchromesh clutch collar 51 which is formed with the annular groove 52 for receiving the aforesaid shiftable yoke 31 whereby the sleeve or collar 51 may be shifted axially forwardly or rearwardly to engage the clutching teeth 50 thereof with the clutching teeth 38 or 36 respectively. In Fig. 2 the collar 51 is in its neutral position at which time the detent balls 45 engage outwardly in the annular groove 53 which is formed in the clutching teeth 50.

Operating between the clutching teeth 50 and teeth 36, 38 I have provided synchronizing means for insuring a uniform rotation of the teeth to be clutched and means for preventing a complete shifting movement of collar 51 to engage teeth 36 or 38 until the synchronizing relationship of the clutching teeth is established. This synchronizing and clutching controlling means comprises a synchronizing control ring structure 54 having a substantially cylindrical body portion formed with the axially projecting tongues 55 which enter the guideways 48 and extend into the respective recesses 47, the circumferential width of each tongue 55 being substantially less than the corresponding width of the recesses 47 so that while the ring 54 is rotated with the hub 42, the ring is also capable of limited rotation relative to the hub in opposite directions from the neutral condition or position illustrated in Fig. 6. The ring 54 is also capable of limited axial movement relative to the hub 42, inward movement being limited by the ring striking the hub and axial outward movement being limited by the cone 37 as will presently be more apparent.

Ring 54 carries the synchronizing driven friction clutch element 56 which is illustrated in the form of a bronze cup fixed to the ring by striking circumferentially spaced portions thereof outwardly at 57 into the radially extending openings 58 formed in ring 54. The inner clutching face of cup 56 has the general contour of a portion of a cone similar to the smooth surface of the companion clutching cone 37 and as one of the features of my improvements I have formed the clutching surface of the cup by cutting therein the threads 59 best shown in Fig. 12 which is a development about ten times actual size. In actual practice I find that approximately forty threads per inch will give good results in accordance with the objects of my invention. The threads 59 are furthermore preferably formed left handed and the angle of the cone 37 is preferably somewhat steeper than customary in synchromesh devices commonly used, this cone angle being approximately in the neighborhood of seven degrees which will be recognized by those skilled in the art as being somewhat greater than the angle of rest for the cup and cone which is ordinarily something in the neighborhood of five and one half degrees or less.

The ring 54 is provided with a set of synchronizing controlling external teeth 60 adapted, prior to the synchronizing action, to lie in the path of shifting of teeth 50 toward teeth 36 to prevent clashing of these teeth. In order to control the operation of ring 54 from collar 51 for synchronizing teeth 50 and 36 for conditions of rotation when teeth 36 are rotating in the same direction as teeth 50 but relatively faster or slower, the inner ends of teeth 60 are pointed or bevelled to form the faces 61 and 62, the adjacent ends of teeth 50 being correspondingly bevelled to form the faces 63, 64 which are respectively engageable with the faces 61 and 62. The included angle of the faces of teeth 60 is made sufficiently great to insure the synchronizing action and I have found that an angle of approximately one hundred and ten degrees, by way of citing an example, will give good results.

The ends of teeth 50 are preferably formed as illustrated in Fig. 6B with arcuately curved side faces tangent to planes designated at 50ª having an included angle of approximately 90°. These planes pass through the contacts which teeth 50 have in entering teeth 36. The teeth 36 preferably are flat sided having an included angle of 90°.

By reason of the curved end faces of teeth 50, the ends of the teeth present face portions tangent to planes designated at 50ᵇ having an included angle of approximately 110°. These planes pass through the contacts which teeth 50 have in first engaging teeth 60. Teeth 60 preferably are flat sided having an included angle of approximately 110°.

Such arrangement facilitates the servo-action on the ring 54 and at the same time provides proper clutching with teeth 36 without any "dead ending."

The ends of the teeth 36 which are directed toward the teeth 50 are also preferably pointed at 40 to insure ready entry of teeth 50 between the spaces of teeth 36 when the synchronizing action between teeth 50 and 36 has been accomplished preparatory to the final positive clutching engagement of these teeth. A similar synchronizing control ring structure 54ª is provided between hub 42 and teeth 38 for producing a synchronized engagement of teeth 50 with teeth 38 and since the structure of the synchronizing rings 54 and 54ª is preferably similar, I have applied similar reference numerals to the ring 54ª. It will also be noted that the rearwardly extending ends of teeth 38 are bevelled or pointed at 41 to correspond to the pointed ends 40 of the teeth 36.

Inasmuch as the synchronizing clutching action is substantially similar for the opposite shifting movements of collar 51, the description of the operation will, for the most part, be limited to the rearward shifting movement of the collar for clutching the teeth 50 thereof with the driving teeth 36 of the second speed gear 27.

In the operation of the synchronizing mechanism let it be assumed that it is desired to establish the second speed ratio drive for the motor vehicle and that at the time of shifting the collar 51 toward the teeth 36 of gear 27, the gear 27 is rotating in the usual direction indicated by arrows 67 and at a faster speed of rotation than that of the shaft 23 along with hub 42, ring 54 and collar 51. The operator having actuated the usual clutch to release the drive from the engine to the driving shaft 15, the gear shift lever 28 is manipulated to operate the shifting yoke 31 rearwardly starting from the neutral condition of parts illustrated in Figs. 1, 2 and 4 to 6A. With the parts in the neutral condition, the detent balls 45 are extended into the groove 53, and the ring 54, while rotated with the hub 42, is free to assume a position of relative rotation with respect to the hub. For purposes of illustration let it be assumed that the ring 54 is also in its neutral position as indicated in Fig. 6 and by the solid line showing in Fig. 6A. Under such conditions, the tongues 55 are disposed midway circumferentially in the companion recesses 47 and the teeth 60 will then be axially opposite the spaces between teeth 50, the teeth 60 under such conditions permitting teeth 50 to pass rearwardly freely between teeth 60 but for the synchronizing action of ring 54. It will also be observed that there is a clearance between cup 56 and cone 37, these frictional clutching elements being free from frictional engagement when the collar 51 is in the aforesaid neutral position.

When the collar 51 is shifted rearwardly the detent balls 45 provide a releasable connection with the hub 42 so that the latter, together with ring 54, is also shifted rearwardly until frictional engagement is established between cup 56 and cone 37. At the instant of this frictional engagement, the ring 54 will be rotated by the faster rotating cone 37 in a clockwise direction as viewed in Fig. 6. This rotation of ring 54 will be relative to hub 42 and shaft 23 in taking up the clearance indicated at 68 in Fig. 6 thereby moving teeth 60 relative to teeth 50 into the dotted line position illustrated at 60ª in Fig. 6A so as to obstruct, for the moment, the continued rearward shifting of teeth 50 to engage the teeth 36.

The pressure of springs 44 acting on detent balls 45 is relatively light, it being only necessary to have the hub 42 follow the first stage of shifting movement of collar 51 rearwardly to cause the ring 54 to have the limited rotation to hub 42 as aforesaid. At this stage of the operation, collar 51 continues its rearward movement, the detent balls 45 being forced inwardly so that the collar is then shifted axially relatively to the hub 42 as generally indicated in Figs. 7 and 8. This shifting movement of collar 51 brings the faces 64 of teeth 50 into engagement with the faces 62 of teeth 60 carried by the ring 54. The rearward movement of collar 51 then urges ring 54 rearwardly to bring the cup 56 into tight frictional engagement with the cone 37 thereby causing retardation of gear 27 and shaft 15 drivingly connected therewith to synchronize the speeds of shaft 23 and gear 27. It will be understood that the gear 27, under the aforesaid assumed conditions, will be slowed down during the synchronizing action rather than causing the shaft 23 to speed up to the rotation of gear 27 inasmuch as shaft 23 is drivingly connected with the ground wheels of the motor vehicle and offers relatively great resistance to change in rotational speed. On the other hand, the gear 27 is connected to shaft 15 only through the countershaft gears 20 and 17 and is free from driving connection with the engine, it having been assumed that the clutch was operated to release the driving connection between the engine and shaft 15.

Figs. 7 and 8 illustrate the condition of the parts during the synchronizing action which is practically instantaneous, whereupon ring 60 is free to respond to the rotational component exerted by teeth 50 on faces 62 for rotating the ring 54 into the neutral conditions of Figs. 6 and 6A. The collar 51 is then free to continue its rearward movement, teeth 50 freely passing between teeth 60 and into positive engagement with the teeth 36, this last stage of the shifting movement of collar 51 being so rapid that the teeth 50 and 36 retain their synchronized condition for the final clutching action.

It should be understood that while I have described the operation of the rearward shifting movement of collar 51 as comprising a series of stages, the shifting movement of the collar in practice is practically continuous and almost instantaneous as to the impression or effect on the operator manipulating the gear shift lever 28. When the operator desires to move the collar 51 back to the neutral position, it will be readily understood that the teeth 50 will immediately be withdrawn forwardly from the teeth 36, the ball detents 45 again entering the groove 53 so as to restore the parts to the Fig. 1 position.

The operation in shifting the collar 51 forwardly to engage the teeth with the teeth 38 carried by the driving shaft 15 is substantially similar to that previously described, the ring 54ª responding to the first part of the shifting movement of the collar to obstruct complete shifting movement of the collar until the rotational speeds of shaft 15 and shaft 23 has been synchronized as will be readily understood.

It will be noted that my synchronizing mechanism is bi-directional in its action for synchronizing and clutching the second speed gear 27 as well as the driving shaft 15. This is obtained primarily by providing the pointed teeth 60 together with the cooperating pointed or oppositely bevelled faces at the ends of teeth 50. It therefore does not make any difference as to the effective operation of the device at the time of making a shift whether the collar 51 is rotating faster or slower than gear 27 or gear 16 as the case may be and this merely means that the synchronizing rings 54 or 54ª will be rotated relative to collar 51 in either a clockwise or counter-clockwise direction in obstructing complete shifting movement of collar 51 until synchronization has been accomplished. For example in connection with the shifting movement of collar 51 to clutch with teeth 36 of the second speed gear 27, in the event that the second speed gear is rotating slower than shaft 23 and collar 51, the synchronizing ring 54 upon its initial engagement with cone 37 will be moved in the opposite direction of that aforesaid to position the teeth 60 in the dotted line position 60ᵇ of Fig. 6A. Such movement of the ring relative to hub 42 is permitted by movement of tongues 55 taking up the clearance in recesses 47 indicated at 69 in Fig. 6. Such movement places the teeth 60 so as to obstruct further shifting of teeth 50 until the faces 63 of teeth 50 acted on the faces 61 of teeth 60 to synchronize the speeds of teeth 50 and 36 whereupon teeth 50 will cause the ring 34 to move to its neutral position and permit completion of the shifting movement of collar 51 in clutching the teeth 50 with the teeth 36. A similar operation is met in connection with shifting the collar 51 to engage the teeth 38 of shaft 15 and in Fig. 11 I have illustrated a condition generally corresponding to that illustrated in Fig. 7 where the collar 51 is in the course of synchronizing shafts 15 and 23 from a condition where collar 51 was rotating faster than shaft 15 prior to the synchronizing operation.

The bi-directional conditions which are met with in the type of transmissions under consideration may be briefly outlined as follows. In connection with clutching the collar 51 to engage teeth 36 of second speed gear 27, such a shift is frequently made during acceleration of the motor vehicle in shifting from low speeds to second speeds. Under such conditions the second speed gear 27 is ordinarily rotating faster than shaft 23 so that the synchronizing mechanism operates to slow down the speed of the second speed gear. On the other hand where a shift is made from high or direct down to second speed, the second speed gear 27 will ordinarily be rotating slower than shaft 23 so that it is necessary to speed up gear 27. In each instance the synchronizing operation takes place between the second speed gear 27 and shaft 23, the main clutch between the engine and the shaft 15 being released, as aforesaid.

The bi-directional conditions for synchronizing the collar 51 with the teeth 38 of shaft 15 are ordinarily met with as follows. During a shift from second speed to direct, shaft 15 is ordinarily rotated faster than shaft 23 so that it is necessary to slow down shaft 15 during the synchronizing operation. On the other hand, during the shift from second speed to direct where the operator may halt the shift lever 28 in neutral until the shaft 15 slows down below the speed of shaft 23, then it is necessary to speed up the shaft 15 in synchronizing the speed thereof with that of shaft 23.

The ball detents 45 between collar 51 and hub 42 insure preliminary frictional contact between the synchronizing rings 54 or 54ª and the cones 37 or 39, respectively, in order to impart the rotational directional movement to the synchronizing rings in moving them into position to momentarily obstruct further shifting of collar 51 until the synchronizing action has taken place. I have therefore provide for a servo or self-energizing operation for the synchronizing rings by causing the obstructing adjustments of these rings by reason of the rotation of the other part of the mechanism to be clutched. As soon as the ball detents 45 have been broken away, the collar 51 forces the synchronizing ring contrary to its rotating tendency by reason of the servo wedge on the teeth of the synchronizing ring and the pointed teeth 50 carried by the collar 51.

As soon as the synchronizing ring 54, for example, has rotated to its neutral position in synchronizing the parts, the servo action ceases and the ring is free from frictional engagement with the cone 37 except for the negligible drag of the ball detent 45 against the hub 42 only during completion of the final shifting of collar 51 into engagement with teeth 36. In shifting the collar 51 toward its neutral position from a condition of engagement with teeth 36 or 38, it is of importance to note that the ball detents 45 drag the hub 42 by the frictional engagement with collar 51, before entry of the ball detents into the annular collar groove 53, to insure complete release of cup 56 and cone 37 the instant that relative rotation at the cone takes place. Of course, after the detent balls 45 enter the groove 53, the previously released cup 56 is positively moved clear of the cone 37. Relative rotation between each cup and cone starts as soon as the shift collar teeth leave either set of gear clutch teeth so that it is an advantage to free the cup and cone contact as soon as possible.

Heretofore with synchronizing devices customarily used, during cold weather the lubricant in the transmission would frequently cause the hub to stick on the transmission main shaft corresponding to shaft 23 in my illustration, and thereby destroy any synchronizing action inasmuch as under such conditions the shift collar would move directly to endeavor to clutch with a set of gear teeth. With my improved arrangement however, even should the oil viscosity become such as to cause the hub 42 to stick on with shaft 23 against sliding operation by the ball detents 45, the synchronizing cup 54, for example, will be caused to rotate by the oil viscosity at the cone 37 so that it will move rotatably to perform its obstructing action for the collar 51 and also the synchronizing action. Thus the synchronizing rings 54 and 54ª are separate from hub 42 in that they are capable of rotation relatively thereto and also longitudinal movement with respect to the hub.

Heretofore with synchronizing devices customarily employed, the frictional cup would often freeze up with the cone so that in going out of a previously engaged gear contact to the opposite direction, the ball detents would fail to pick up the hub with the result that a gear clashing would result from the opposite shifting movement of the collar and this, of course, would cause failure of the clutching teeth and other parts of the mechanism. With my improved device such conditions have been prevented owing to my improved relationship of parts, including the following in particular.

I preferably employ an angle for the cup and cone sets which is above the angle of rest which is ordinarily around five and one half degrees or less. Thus I preferably use an angle of approximately seven degrees. A high angle could not be used heretofore as a practical matter because it would require objectionably excessive ball detent pressure in order to get enough bite at the frictional engagement to obtain the synchronizing action.

I preferably form the threads 59 on the cup 56 leaving the cone 37 with a plain smooth surface. I also preferably employ threads rather than annular serrations inasmuch as serrations would tend to roughen the mating clutch surface evenly whereas the threads operate to wipe the oil film from the cone surface and operate on different places on the cone tending to keep the cone surface smooth.

It will be noted that my bi-directional synchronizing mechanism operates to synchronize the shaft speeds when shifting from low gear to second or direct. Heretofore, when making such shifts, especially when made rapidly, the clutching teeth would clash even when employing commercial types of synchronizing devices.

The threads 59, instead of being brought to a sharp apex, are preferably formed with a very narrow land 70 (see Fig. 12) primarily for ease of manufacture and especially since a sharp apex is not necessary to the desired functioning of the synchronizing action. Also, a sharp apex would tend to flatten off giving rise to objectionable axial movement of the rings 54, 54ª even to the extent of losing the necessary predetermined clearance between the friction clutching members 37, 56 for example. It will be observed that the thread spaces 71 provide for oil retreat during friction clutching when the oil film is cut and the oil is displaced.

The greatest obstructing efficiency of rings 54, 54ª is required on a down shift, from direct to second, which requires speeding up of the parts drivingly connected to gear 27 such as the countershaft gearing and driven parts of the usual main clutch. On an up shift, from second to direct, the countershaft gears have a natural tendency to slow down requiring less obstructing efficiency of ring 54ª.

If the second speed ring 54 had its cup 56 formed with right hand threads, instead of left hand threads as illustrated, then the synchronizing action on a shift down would tend to pull the ring 54 tight on the cone 37 tending to prevent release of ring 54 at just the right tme viz., after the servo action and at the instant of synchronization. This is apparent because during the synchromesh action the driven shaft 23 and cup 56 are driving cone 37 on second speed gear 27, the main clutch being disengaged, and this drive would produce the aforesaid objectionable action at cup 56 and cone 37 if right hand threads were used at cup 56. During all synchromesh actions it must be borne in mind that the car, through shaft 23, is the driver. However, the provision of left hand threads 59 on cup 56 opposes this objectionable tendency since the cup tends to thread away from the cone, thereby facilitating the desired synchronizing action.

The rings 54 and 54ª are preferably identical so that they are interchangeable. This is a decided production and assembly advantage and avoids any tendency to getting the rings mixed as might result if ring 54ª had right hand threads and ring 54 left hand threads.

The action of synchromesh at ring 54ª is to slow down the main drive pinion 16, and parts connected thereto, so that ring 54ª becomes a retarding device and the left hand threads on ring 54ª tend to thread the ring off the cone 39. If the car is stopped and a shift to direct is made, the ring 54ª is still a retarding device resulting in the same unthreading action of the ring because of the inertia of the parts connected to shaft 15 often augmented by rotative drag through the main clutch when disengaged.

In the shift up, from low to second, the gear 27 going faster than ring 54, this ring threads on the cup 37 immediately on engagement. Since the synchromesh action is practically instantaneous the threading tendency disappears since the servo action is dissipated. This is an advantage because the threading-on action increases the rapidity of the synchromesh action.

All up shifts, to faster driving speed ratios, give rise to retarding effects at the synchronizers and all down shifts, to slower driving speed ratios, give rise to accelerating effects at the synchronizers with respect to corresponding slowing down or accelerating the countershaft gearing and driven parts of the main clutch. Whenever the gear to which a synchromesh shift is made is to be retarded then a threading-on action is desired and whenever such gear is to be accelerated a threading-off action is desired at ring 54 or 54ª. The provision of left hand threads for both rings 54 and 54ª best meets these requirements, especially when the advantages of interchangeability and demands for maximum obstructing conditions are considered.

While the shift up from second to direct results in a threading-on action of ring 54ª, with left hand threads, there is so little differential in the speeds of the synchronizing parts for this shift that a screwing-on effect of the ring is not so necessary. In this connection the inertia of the countershaft gearing and driven parts of the main clutch plays an important part since a mechanical advantage arises at the main drive pinion 16 by reason of its mesh with a larger gear 17 making the threading-on action at the direct control ring 54a less important than at the second speed control ring 54 because the second speed gear 27 is driven at a reduction and by torque multiplication from the countershaft gearing. Thus, in a shift from low to second the threading-on action of ring 54 provides a high degree of servo action, and on a shift down from third to second the ring 54 has a desired threading-off action at this function of requirement for greatest obstructing efficiency as aforesaid.

I therefore deem it advisable, everything considered, to employ left hand threads 59 at both rings 54 and 54a, the second speed synchronizer being the more important so that if desired the ring 54a might be formed with right hand threads. By left hand threads I mean a thread of opposite hand to the hand of rotation of the member engaged by the thread. It is of course standard practice to rotate the drive shaft 15 in a right hand direction of rotation and this likewise causes right hand rotation of the gears 16, 27 as well as driven shaft 23 for direct and second speed drives. Thus the left hand threads cause the control ring 54, for example, in the worst condition of a down shift from direct to second, to strip off or to be forced away from the friction cone 37 at the instant of synchromesh thereby preventing "dead ending" of sleeve teeth 50 at the teeth 36 of the second speed gear 27 because the control ring teeth 60 then no longer are connected to gear 27 and therefore do not guide the sleeve teeth which are free to adjust themselves relative to the gear teeth 36.

Referring to the modification in Figs. 13 and 14, I have illustrated many parts identical in structure and function to the Fig. 2 embodiment as indicated by identical reference characters, it being understood that the Fig. 13 synchronizer is to be employed in lieu of the Fig. 2 synchronizer.

In Fig. 13, the axially shiftable hub 42a functions as in Fig. 2 with collar 51 and control rings 72, 72a which have functions similar to control rings 54, 54a. However, the identical rings 72, 72a each has its clutching cup formed integrally with the ring and threaded at 59 as in Fig. 12. Each ring in Fig. 13 has a series of axially extending tongue parts 55a projecting as in Fig. 2 but each tongue 55a has its sides rounded at 73 (see Fig. 14) to fit the walls of one of a plurality of drilled recesses or apertures 47a each of which has its axis parallel to that of shaft 23. The apertures 47a are preferred in quantity production to the milled apertures 47 of Fig. 2 since apertures 47a may be formed in a single multiple drilling operation through the hub 42a instead of separate milling operations for the apertures 47 of Fig. 2. Each tongue 55a has the aforesaid clearance 68 and 69 with an aperture 47a for identical functions as in the case of tongues 55 and apertures 47 aforesaid. Hub 42a is also provided with the aforesaid springs 44 and associated ball detents 45.

The drilled apertures 47a have the further advantage over the Fig. 2 structure in that they do not require interruption of the teeth 49 of the hub 42a as with the teeth 49 of hub 42 (see Fig. 3).

The operation of the Fig. 13 structure is identical with that described in detail in connection with Fig. 2, as will be readily apparent, so that such operation will not be repeated.

Referring to the embodiment illustrated in Fig. 15, and the companion showing in Fig. 16, I have illustrated a synchronizer to replace that shown in Fig. 2 or Fig. 13.

In Fig. 15 the hub 42b is axially fixed on splines 33 by ring 32a and a forward snap ring 74, this hub being shown with drilled apertures 47a for tongue projections 55a of control rings 72, 72a as in Fig. 13. The hub 42b has a second series of axially drilled holes 75 each receiving a compression coil spring 76 which has its ends acting on the rings 72, 72a respectively. Springs 76 may be termed "spreader" springs in that they yieldingly urge rings 72, 72a apart and into frictional contact with cones 37, 39a respectively. In Fig. 15 it is no longer necessary to employ the ball detents of Fig. 2 since hub 42b is axially fixed and since I have provided other means for establishing the rotative positioning of rings 72, 72a in taking up clearance 68 or 69 to obstruct the positive clutching between the teeth 50b of shift sleeve 51b and teeth 36 or 38 prior to the synchronizing action.

The teeth 50b of sleeve 51b as well as teeth 49b of hub 42b are now uninterrupted owing to the arrangement of drilled apertures 47a and the absence of groove 53 of Fig. 2.

The means at springs 76 impart a light rotative drag on gears 16 and 27, relative to shaft 23, thereby providing braking means for the driven parts of the main clutch as well as the countershaft cluster gear set so that the synchronizing action is facilitated for all speed ratio changes of the transmission including low and reverse. This is very important when shifting into low and reverse from the usual condition of the vehicle standing still. At such times shaft 23 is non-rotating and as soon as the main clutch is released preparatory to a shift from neutral to reverse, the springs 76 acting to engage rings 72, 72a with cones 37, 39 respectively will brake the rotation of the parts drivingly connected to gears 16 and 17 and thereby prevent tendency of these parts to "spin" after disengagement of the main clutch. This braking action, by holding the countershaft set from spinning allows shift of gear 26 into gear 19 or gear 22 without objectionable noise or damage to the g ar teeth.

I have therefore provided simple means for utilizing the synchromesh means for the second and direct speeds to also synchronize the gears for the low and reverse speeds, this means also simplifying the synchromesh means and facilitating its operations in connection with second and direct speed shifts.

By fixing hub 42b axially, oil shear at splines 33 is eliminated thereby facilitating the operation of the device especially under winter conditions.

When a shift is made to establish direct, for example, sleeve 51b is thrust forwardly but does not move control ring 72a to establish the servo action at cone 39 since springs 76 maintain ring 72a in light frictional engagement with cone 39 so as to misalign teeth 50b and the teeth 60 of ring 72a. When sleeve 51b is shifted forwardly to thrust against teeth 60 of ring 72a then the ring 72ª is thrust into increasing frictional engagement with cone 39 to synchronize gear 16 with shaft 23 and, as in the Fig. 2 structure, the sleeve 51ᵇ then moves into positive clutching with teeth 38. Therefore the synchronizing action for gears 16 or 27 in the Fig. 15 structure is substantially the same as in the Fig. 2 structure with the exception of the establishment of the rotation of either ring 72ª or 72 relative to hub 42ᵇ to mis-align the teeth on the ring with those on the hub and shift sleeve.

Fig. 17 is similar to the Fig. 15 arrangement with the exception that in Fig. 17 the hub 42ᶜ is now free to axially slide on splines 33, and the ball detents 45 of Fig. 13 are incorporated to form the releasable connection between sleeve 51ᶜ and hub 42ᶜ. If desired this arrangement may be used to advantage, the spreader springs 76 functioning as in Fig. 15 but in Fig. 17 shifting the sleeve 51ᶜ carries hub 42ᶜ during the first part of sleeve shift as in Fig. 2. Where one or more spreader springs are used to act on both of the control rings, I prefer to fix the hub aginst axial shift as in Fig. 15 because under such conditions it is not necessary to shift the hub to establish obstructing rotation of the control rings during synchromesh shift.

In Figs. 18 to 21, I have illustrated a further synchromesh arrangement which may be used in place of any of the aforesaid synchromesh organizations. In Fig. 18 the hub 42ᵈ may be axially slidable or fixed as illustrated by stops 74 and 32ª at splines 33. This hub is formed with peripheral teeth 49ᵈ engaged, as before, with the uninterrupted internal teeth 50ᵈ of shift sleeve. The teeth 49ᵈ are interrupted by the annular channeled groove 77 formed in hub 42ᵈ, the groove 77 opening outwardly and receiving an expansion ring 78 which is split at 79 for convenient installation. Ring 78 is compressed and yieldingly expands to frictionally engage sleeve teeth 50ᵈ.

Hub 42ᵈ has a series of outwardly open axially extending recesses or apertures 47ᵈ which may be conveniently formed by milling across the hub at the time of cutting the teeth. Extending into these apertures are the tongue projections 55ᵈ of control rings 80, 80ª which are otherwise identical with rings 54, 54ª of Fig. 2. Projections 55ᵈ, as in Fig. 2, have clearances 68, 69 with the apertures for the same purpose as that aforesaid.

The expansion ring 78 engages the inner ends of projections 55ᵈ. Control ring 80, 80ª preferably have clearance at 81 with teeth 50ᵈ and clearance at 82 is provided between the inner wall of apertures 47ᵈ and tongues 55ᵈ so that the control rings "float." Thus the control rings 80, 80ª are self-centering at the engagement of threads 59 with cones 37, 39 respectively and the threads 59 may more readily release the frictional engagement during threading-out functions as set forth for the Fig. 2 structure.

Instead of using a spreader spring of coil spring type as in Fig. 15, I have illustrated in Fig. 18 (see also Fig. 21) a spreader spring 83 in the form of flat spring steel or bronze for anti-rust, this spring having integral tongues 84 formed by cutting the body portion 85 at 86 and bending the tongues so that they will exert axial thrust when installed. The flat body portion 85 rests against the forward face of hub 42ᵈ and tongues 84 thrust against the face 87 of ring 80ª at points between tongues 55ᵈ. The spring 83 has the body portion 85 thereof formed with a series of notches 88 respectively accommodating passage of projections 55ᵈ therethrough.

With sleeve 51ᵈ in its neutral setting, tongues 84 thrust forwardly to exert frictional engagement of control ring 80ª with cone 39 to function similarly to the spring 76 of Fig. 15. The reaction of spring 83 acts against hub 42ᵈ which is fixed against axial sliding on shaft 23 in this embodiment. The control ring 80 is illustrated free from frictional engagement with cone 37.

When the direct teeth 38 are to be clutched by teeth 50ᵈ of shift sleeve 51ᵈ, the latter is moved forwardly but does not have to establish obstructing rotation of control ring 80ª since spring 83 performs this function. Sleeve 51ᵈ is forced toward teeth 60 of ring 80ª to synchronize gear 16 with shaft 23 to permit completion of forward shift of sleeve 51ᵈ just as in the Fig. 2 structure. On the return shift the threads or teeth 59 of ring 80ª "float" the ring as aforesaid. Shift of sleeve 51ᵈ forwardly relative to rings 80, 80ª is permitted by slipping at the friction expansion ring 78.

When second speed is to be obtained, sleeve 51ᵈ is shifted rearwardly. The initial shift of the sleeve carries ring 80 rearwardly with the sleeve by reason of the friction connection afforded by the expansion ring 78. As soon as the threads 59 of control ring 80 engage cone 37 the control ring is rotated to obstruct further and final shift of the sleeve until the sleeve thrust acting on the control ring synchronizes gear 27 with shaft 23. When sleeve teeth 50ᵈ then shift across the teeth 60 of control ring 80 to clutch with teeth 36 of gear 27, releasing the ring 80 for "floating" at its threads 59, the sleeve 51ᵈ slips across the expansion ring 78 which cannot move axially any further than the control ring. Return shift of the sleeve moves ring 80ª forwardly by the friction at ring 78, the threads 59 thereby cutting through the oil film at surface 39 to prepare these friction surfaces for synchronizing action even before sleeve 51ᵈ reaches the Fig. 18 neutral position during said return shift.

A ring 78 of rectangular cross section is preferred since it provides relatively great frictional contact efficiency. The spreader spring 83 functions to exert frictional drag on gear 16 so as to facilitate all speed ratio changes of the transmission as in the case of the coil springs 76 although the latter in Figs. 15 and 17 are arranged to exert the drag at both gears 16 and 27.

The expansion ring 78, in providing a frictional releasable connection between sleeve 51ᵈ and hub 42ᵈ, affords improved ease of operation and presents an arrangement much simpler and less costly than the ball detents 45 of Fig. 2.

If desired both of the control rings may be initially moved into frictional engagement for the limited rotation relative to the hub in establishing the obstructing action for the shift sleeve as shown in Fig. 22. In this embodiment, the spreader spring of Fig. 18 is omitted and the expansion ring 78ª is shown of circular cross-section which affords somewhat less friction surface engagement than ring 78 but provides greater unit pressure because of the lesser surface of contact. The parts are otherwise as shown in Fig. 18 and their functions are the same.

In Fig. 22 forward shift of sleeve 51ᵈ first moves control ring 80ª with the sleeve to engage cone 39 thereby rotating control ring 80ª into its obstructing position, the expansion ring 78ª affording the connection between the sleeve and the control ring. Continued forward shift of the sleeve synchronizes teeth 38 with teeth 50ᵈ as before to accommodate completion of the forward shifting of the sleeve, the sleeve sliding beyond the expansion ring 78ᵃ. The synchronization is practically instantaneous so that control ring 80ᵃ is free from thrust axially during the secondary phase of shifting of the sleeve across teeth 60.

The rearward shift of sleeve 51ᵈ to clutch teeth 36 acts through the expansion ring 78ᵃ to initially move control ring 80 in the same manner as in effecting the direct speed clutching. In both Figs. 18 and 22 the hub annular groove 77 is of such width axially to accommodate axial movement of the control ring 78 or 78ᵃ to establish the initial clutching with the respective friction cones and for the further slight axial movement of the control rings in effecting synchronization of the parts.

I do not limit my invention, in the broader aspects thereof, to any particular combination and arrangement of parts such as shown and described for illustrative purposes since various modifications will be apparent from the teachings of my invention and scope thereof as defined in the appended claims.

What I claim is:

1. In a synchronizing clutch mechanism for automotive change speed transmissions, relatively rotatable shafts to be clutched, positively engageable clutch elements respectively driven with said shafts, a friction cup clutching member driven with one of said shafts, a friction cone clutching member driven with the other of said shafts, means for forcing one of said friction clutching members against the other to synchronize said shafts and for subsequently shifting one of said positive clutch elements into engagement with the other, one of said friction clutching members having its friction surface threaded, said threads being of suitable pitch and in number in excess of approximately thirty per inch to present a relatively small friction surface area capable of substantially instantaneously cutting through the oil film between the friction surfaces of said members and thereby provide relatively high unit pressure of engagement of said friction members affording substantially instantaneous synchronization of said shafts and minimization of wear of the engaging friction surfaces of said friction clutching members.

2. In a synchronizing clutch mechanism for automotive change speed transmissions, relatively rotatable shafts to be clutched, positively engageable clutch elements respectively driven with said shafts, a friction cup clutching member driven with one of said shafts, a friction cone clutching member driven with the other of said shafts, means for forcing one of said friction clutching members against the other to synchronize said shafts and for subsequently shifting one of said positive clutch elements into engagement with the other, one of said friction clutching members having its friction surface threaded, said threads being of relatively low pitch, in excess of approximately thirty per inch, to present a relatively small friction surface area capable of substantially instantaneously cutting through the oil film between the friction surfaces of said members and thereby provide relatively high unit pressure of engagement of said friction members affording substantially instantaneous synchronization of said shafts and minimization of wear of the engaging friction surfaces of said friction clutching members.

3. In a synchronizing clutch mechanism for automotive change speed mechanisms, a rotatable driving member, a driven shaft coaxial with the axis of rotation of said driving member, driving clutch teeth rotatable with said driving member, a driving friction clutch part rotatable with said driving member, a hub structure mounted on said shaft for rotation therewith, a shiftable sleeve splined to said hub structure and having clutch teeth adapted to clutch with said driving clutch teeth, a synchronizing structure driven with said hub structure and having predetermined rotation relative thereto for movement from a first position of obstructing shift of said sleeve to a second position permitting shift of said sleeve, said synchronizing structure having a friction clutch part engageable with said driving friction clutch part, said shift sleeve being adapted to force said friction clutch parts relatively together to synchronize rotation of the driving member with rotation of the shaft and thereby accommodate movement of said synchronizing structure from said first position to said second position thereof, one of said friction clutch parts having its friction surface threaded, the threads being of such a hand with relation to the hand of rotation of the friction clutch part engaged by said threads as to force the threaded friction clutch part away from the other friction clutch part at approximately the instant of synchromesh thereby facilitating clutching of said sleeve teeth with said driving teeth.

4. In a synchronizing clutch mechanism for automotive change speed transmissions, coaxially aligned driving and driven shafts, a primary driving gear driven with the driving shaft, clutch teeth driven with the primary gear, a friction clutch member driven with the primary gear, a secondary driving gear loose on the driven shaft and driven from the primary gear in the same direction but at a different speed, said driving direction being right handed when viewed from the driving shaft toward the driven shaft, clutch teeth driven with the secondary gear, a friction clutch member driven with the secondary gear, a hub structure drivingly connected to said driven shaft and disposed intermediate said gears, said hub structure having peripheral splines, a pair of interchangeable similar synchronizing control rings respectively disposed between said hub structure and one of said gears, each of said rings carrying peripheral teeth and having a friction clutch part adapted for frictional engagement with one of said clutch members, means drivingly connecting said control rings with said hub structure for limited rotation relative thereto, and a shift sleeve having clutch teeth engaging the splines of said hub structure and adapted for shifting movement selectively in opposite directions between the teeth of said rings and therebeyond for clutching with the clutch teeth of said primary and secondary gears, the teeth carried by said rings being adapted to selectively obstruct shifting movement of said sleeve teeth prior to synchronization of the driven shaft with one of said gears, each of said rings having its friction clutch part threaded, the threads being of a left hand.

5. In a synchronizing clutch mechanism for automotive change speed transmissions, a pair of coaxial relatively rotatable driving and driven members to be clutched, said driving member having driving clutch teeth and a friction clutch part rotatable therewith, a hub structure formed with peripheral splines, means for mounting said hub structure on said driven member for rotation therewith, a shift sleeve having driven clutch teeth engaging said splines and shiftable with said sleeve to clutch with said driving clutch teeth, a synchronizing structure having a friction clutch part engageable with said driving-member-clutch-part, means drivingly connecting said synchronizing structure with said hub structure and accommodating predetermined rotation relative thereto for movement of said synchronizing structure from a first position of obstructing shift of said sleeve to a second position permitting shift of said sleeve, yielding means acting on said synchronizing structure to engage the clutch part thereof under relatively light pressure with said driving-member-clutch-part prior to shift of said sleeve toward said driving clutch teeth whereby said synchronizing structure is disposed in its said obstructing position, and means responsive to shift of said sleeve toward said driving clutch teeth for urging said clutch parts relatively together under relatively heavy pressure to synchronize said members and thereby effect movement of said synchronizing structure to its said second position.

6. In a synchronizing clutch mechanism for automotive change speed transmissions, a pair of coaxial relatively rotatable driving and driven members to be clutched, said driving member having driving clutch teeth and a friction clutch part rotatable therewith, a hub structure formed with peripheral splines, means for mounting said hub structure on said driven member for rotation therewith but preventing movement of said hub structure axially of said driven member, a shift sleeve having driven clutch teeth engaging said splines and shiftable with said sleeve relative to said hub structure to clutch with said driving clutch teeth, a synchronizing structure having a friction clutch part engageable with said driving-member-clutch-part, means drivingly connecting said synchronizing structure with said hub structure accommodating axial movement of said synchronizing structure and predetermined rotation thereof relative to said hub structure for movement of said synchronizing structure from a first position of obstructing shift of said sleeve to a second position permitting shift of said sleeve, yielding means acting on said synchronizing structure to move the same axially to engage the clutch part thereof under relatively light pressure with said driving-member-clutch-part prior to shift of said sleeve toward said driving clutch sleeve whereby said synchronizing structure is disposed in its said obstructing position, and means responsive to shift of said sleeve toward said driving clutch teeth for urging said clutch parts relatively together under relatively heavy pressure to synchronize said members and thereby effect movement of said synchronizing structure to its said second position.

7. In a synchronizing clutch mechanism according to claim 5, wherein the yielding means comprises a ring member having a body portion and a yielding tongue portion deflected therefrom, one of said portions engaging the hub structure and the other of said portions engaging the synchronizing structure.

8. In a synchronizing mechanism for motor vehicle transmissions, coaxial driving members each carrying a set of clutch teeth and a friction clutch element, means drivingly connecting said members together for rotation at different speeds, a driven member adapted to selectively receive a drive from said driving members, a hub structure mounted on said driven member intermediate said driving members, a shift device driven with said hub and having clutch teeth adapted to selectively clutch with said sets of clutch teeth, a synchronizing control structure between each of said driving members and said hub structure, each of said control structures having a friction clutch part engageable with one of said friction clutch elements and a stop for controlling shift of said shift device, means drivingly connecting said control structures with said hub structure for accommodating axial and rotative movements of said control structures relative to said hub structure, and yielding means extending through said hub structure and urging separation of said control structures for engaging said friction clutch parts with said friction control elements respectively.

9. In a synchronizing mechanism for motor vehicle transmissions, coaxial driving members each carrying a set of clutch teeth and a friction clutch element, means drivingly connecting said members together for rotation at different speeds, a driven member adapted to selectively receive a drive from said driving members, a hub structure, means mounting said hub structure on said driven member for rotation therewith but preventing movement of said hub structure axially of said driven member, a shift device driven with said hub structure and having clutch teeth adapted to selectively clutch with said sets of clutch teeth, a synchronizing control structure disposed between each of said driving members and said hub structure, each of said control structures having a friction clutch part engageable with one of said friction clutch elements and a stop for controlling shift of said shift device, said hub structure having an annular peripheral groove and a plurality of axially extending apertures intersecting said annular groove, each of said control structures having tongues respectively extending in said apertures with clearance accommodating limited rotation of said control structures relative to said hub structure, an expansion ring disposed in said annular groove in frictional expanding engagement with said shift device, said annular groove accommodating axial shift of said expansion ring therein, the tongues of said control structures being engageable by said expansion ring whereby said expansion ring provides a releasable connection between said shift device and said control structures to effect selective engagement of said friction clutch parts respectively with said friction clutch elements, said expansion ring accommodating additional shift of said shift device relative to said control devices for effecting selective clutching of the clutch teeth of the shift device with said sets of clutch teeth.

10. In a synchronizing clutch mechanism for automotive change speed transmissions, coaxially aligned driving and driven shafts, a primary driving gear driven with the driving shaft, clutch teeth driven with the primary gear, a friction clutch member driven with the primary gear, a secondary driving gear loose on the driven shaft and driven from the primary gear in the same direction but at a different speed, clutch teeth driven with the secondary gear, a friction clutch member driven with the secondary gear, a hub structure drivingly connected to said driven shaft and disposed intermediate said gears, said hub structure having peripheral splines, a pair of interchangeable synchronizing control rings respectively disposed between said hub structure and one of said gears, each of said rings carrying peripheral teeth and having a friction clutch part adapted for frictional engagement with one of said clutch members, means drivingly connecting said control rings with said hub structure for limited rotation relative thereto, and a shift sleeve having clutch teeth engaging the splines of said hub structure and adapted for shifting movement selectively in opposite directions between the teeth of said rings and therebeyond for clutching with the clutch teeth of said primary and secondary gears, the teeth carried by said rings being adapted to selectively obstruct shifting movement of said sleeve teeth prior to synchronization of the driven shaft with one of said gears, each of said rings having its friction clutch part threaded, said rings having clearance with said shift sleeve and said hub structure in a direction transversely to the axis of rotation of said shafts whereby to accommodate support of said rings at the threads thereof on said clutch members respectively.

11. In a synchronizing clutch mechanism for automotive change speed transmissions, driving means comprising two rotating structures each including a friction clutch member and a set of clutch teeth, a driven shaft adapted to be selectively clutched with said structures, a hub carried by said shaft and having an annular body portion and a peripheral splined rim overhanging said body portion in a direction axially of said shaft, said rim having a portion thereof cut away to form an aperture in said body portion and a pair of oppositely extending openings respectively at the junctures of said rim and body portion, a synchronizing control ring disposed between said hub and each of said structures, each of said rings having an axially-extending tongue projection with rotative clearance through one of said openings to rotatably connect said hub and rings while accommodating limited rotation of said rings relative to each other and relative to said hub, the tongues having end portions disposed in said aperture adjacent each other, each of said rings having a friction clutch part engageable with one of said friction clutch members and a stop, and a shift sleeve having clutch teeth engaging the splines of said rim and adapted for shifting movement selectively in opposite directions under control of said ring stops for effecting synchronized engagement with said sets of clutch teeth.

12. In a synchronizing clutch mechanism for automotive change speed transmissions, driving means comprising a rotating structure having a friction clutch member and a set of clutch teeth, a driven shaft adapted to be clutched with said structure, a hub carried by said shaft and having an annular body portion and a peripheral splined rim overhanging said body portion in a direction axially of said shaft, said rim having a portion thereof cut away to form an aperture in said body portion and an opening at the juncture of said rim and body portion, a synchronizing control ring disposed between said hub and said structure and having an axially extending tongue projecting with rotative clearance through said opening to rotatably connect said hub and ring while accommodating limited rotation of said ring relative to said hub, said tongue having an end portion thereof disposed in said aperture, said ring having a friction clutch part engageable with said friction clutch member and a stop, and a shift sleeve having clutch teeth engaging the splines of said rim and adapted for shifting movement under control of said stop for effecting synchronized engagement with said set of clutch teeth.

13. In a synchronizing clutch mechanism for automotive change speed transmissions, driving means comprising two rotating structures each including a friction clutch member and a set of clutch teeth, a driven shaft adapted to be selectively clutched with said structures, a hub having a body portion carried by said shaft, said hub having its periphery formed with splines extending in a direction axially of said shaft, said hub having a slot extending inwardly through a portion of said splines to provide a tongue-receiving recess opening axially in opposite directions from said body portion, a pair of synchronizing control rings respectively disposed between said hub and each of said structures, each of said rings having an axially extending tongue projecting with rotative clearance through one of said recess openings to rotatably connect said hub and rings while accommodating limited rotation of said rings relative to each other and relative to said hub, the tongues having end portions disposed in said recess adjacent each other, each of said rings having a friction clutch part engageable with one of said friction clutch members and a stop, and a shift sleeve having clutch teeth engaging the splines of said hub and adapted for shifting movement selectively in opposite directions under control of said ring stops for effecting synchronized engagement of the clutch teeth of said shift sleeve with said sets of clutch teeth.

14. In a synchronizing clutch mechanism for automotive change speed transmissions, driving means comprising a rotating structure having a friction clutch member and a set of clutch teeth, a driven shaft adapted to be clutched with said structure, a hub having a body portion carried by said shaft, said hub having its periphery formed with splines extending in a direction axially of said shaft, said hub having a slot extending inwardly through a portion of said splines to provide a tongue-receiving recess which opens axially from said body portion, a synchronizing control ring disposed between said hub and said structure and having an axially extending tongue projecting with rotative clearance through said recess opening to rotatably connect said hub and ring while accommodating limited rotation of said ring relative to said hub, said tongue having an end portion thereof disposed in said recess, said ring having a friction clutch part engageable with said friction clutch member and a stop extending transversely of said tongue, and a shift sleeve having clutch teeth engaging the splines of said hub and adapted for shifting movement under control of said stop for effecting synchronized engagement of the clutch teeth of said shift sleeve with said set of clutch teeth.

15. In a synchronizing clutch mechanism for automotive change speed transmissions, driving means comprising two rotating structures each including a friction clutch member and a set of clutch teeth, a driven shaft adapted to be selectively clutched with said structures, a hub having a body portion carried by said shaft, said hub having its periphery formed with splines extending in a direction axially of said shaft, the body portion of said hub being provided with an aperture extending therethrough in a direction axially of said shaft to provide a tongue-receiving recess opening axially in opposite directions from said body portion, a pair of synchronizing control rings respectively disposed between said hub and each of said structures, each of said rings having an axially extending tongue projecting with rotative clearance through one of said recess openings to rotatably connect said hub and rings while accommodating limited rotation of said rings relative to each other and relative to said hub, the tongues having end portions disposed in said recess adjacent each other, each of said rings having a friction clutch part engageable with one of said friction clutch members and a stop, and a shift sleeve having clutch teeth engaging the splines of said rim and adapted for shifting movement selectively in opposite directions under control of said ring stops for effecting synchronized engagement of the clutch teeth of said shift sleeve with said sets of clutch teeth.

16. In a synchronizing clutch mechanism for automotive change speed transmissions, driving means comprising two rotating structures each including a friction clutch member and a set of clutch teeth, a driven shaft adapted to be selectively clutched with said structures, a hub having a body portion carried by said shaft, said hub having its periphery formed with splines extending in a direction axially of said shaft, said body portion having an aperture extending axially therethrough at a point disposed radially inwardly from said splines, a pair of synchronizing control rings respectively disposed between said hub and each of said structures, each of said rings having a tongue projecting with rotative clearance into said aperture to rotatably connect said hub and rings while accommodating limited rotation of said rings relative to each other and relative to said hub, the tongues having end portions disposed in said aperture adjacent each other, each of said rings having a friction clutch part engageable with one of said friction clutch members and a stop, and a shift sleeve having clutch teeth engaging the splines of said rim and adapted for shifting movement selectively in opposite directions under control of said ring stops for effecting synchronized engagement of the clutch teeth of said shift sleeve with said sets of clutch teeth.

17. In a synchronizing clutch mechanism for automotive change speed transmissions, relatively rotatable shafts to be clutched, positively engageable clutch elements respectively driven with said shafts, a friction cup clutching member driven with one of said shafts, a friction cone clutching member driven with the other of said shafts, means for forcing one of said friction clutching members against the other to synchronize said shafts and for subsequently shifting one of said positive clutch elements into engagement with the other, said friction clutching members having relatively engageable frictionally active portions one of which comprises a substantially continuous thread presenting a spiral friction surface whose area is materially less than half of the friction surface area of the other of said frictionally active portions capable of substantially instantaneously cutting through the oil film between said frictionally active portions and thereby providing relatively high unit pressure of engagement of said frictionally active portions affording substantially instantaneous synchronization of said shafts and minimization of wear of the engaging friction surfaces, said thread being of such a hand with relation to the hand of rotation of the frictionally active portion engaged thereby as to cause the threaded friction clutching member to be forced away from the other friction clutching member at approximately the instant of synchromesh thereby facilitating clutching of said positive clutch elements.

18. In a synchronizing mechanism, two relatively rotatable parts each having a set of clutch teeth and a friction clutching member, a third part adapted for selective drive relation with the first two said parts, a hub structure carried by said third part intermediate the first two said parts, a shift device having drive connection with said hub and having clutch teeth adapted for selective clutching with said sets of clutch teeth, friction clutching elements driven with said hub and respectively adapted for frictional engagement with said friction clutching members to control selective shift of said shift device, and a spreader spring acting between said friction clutch elements urging separation thereof into engagement with said friction clutching members respectively.

19. In a power transmitting mechanism including rotatable driving and driven structures adapted to be positively clutched, one of said structures carrying a set of clutch teeth and a frusto-conical friction surface, the other of said structures being fixed against movement axially thereof and having teeth formed externally thereon, a clutch sleeve encircling said other structure and having teeth formed internally thereon for engagement with said external teeth such that said clutching sleeve is shiftable axially relative to said other structure to clutch said internal teeth with said set of clutch teeth, the teeth of said sleeve being axially spaced from said set of clutch teeth prior to clutching shift of said sleeve, a blocker having a frust-conical portion thereof adapted to engage said friction surface under relatively light blocker-energizing pressure and having blocker teeth projecting into said space prior to clutching shift of said sleeve, said blocker having a connection with said other structure compelling rotation therewith but accommodating limited rotation of the blocker relative to said other structure for accommodating positioning of said blocker teeth in blocking relationship with respect to the teeth of said clutching sleeve when said structures are rotating at relatively different speeds and for disposing said blocker teeth out of said blocking relationship thereby to accommodate shift of said clutching sleeve as aforesaid when said structures are rotating at approximately the same speed, and a spring yieldingly acting to urge said blocker portion into constant engagement with said friction surface for maintaining said blocker in said blocker-energizing engagement with said friction surface whereby to induce said positioning of said blocker in said blocking relationship prior to clutching shift of said clutching sleeve.

20. In a synchronizing mechanism, two relatively rotatable parts each having a set of clutch teeth and a friction clutching member, a third part adapted for selective drive relation with the first two said parts, a hub structure carried by said third part intermediate the first two said parts, means for securing said hub structure to said third part so as to prevent their relative displacement in the direction of their axis of rotation, a shift device having drive connection with said hub and having clutch teeth adapted for selective clutching with said sets of clutch teeth, friction clutching surfaces driven with said hub and adapted for displacement relative to each other for respectively clutching with said friction clutching members in response to selective shift of said shift device, and means operatively disposed between said shift device and said friction clutching surfaces and including a split ring-like expanding element, the last said means being so constructed and arranged as to selectively transmit thrust from said shift device to said friction clutching surfaces thereby to engage the latter respectively with said friction clutching members.

21. In a power transmitting mechanism according to claim 19, wherein, said blocker portion comprises a helically threaded surface.

22. In a synchronizing transmission, a driving member having a friction clutch face and a jaw clutch element, a driven shaft coaxial with said driving element, a hub thereon, a movable clutch element encircling and mounted upon said hub in driving engagement therewith and axially movable with respect thereto, for engagement with said jaw clutch element on the driving member, a blocker synchronizer ring having a friction clutch face for engagement with the aforesaid friction clutch face, having a lost motion driving connection with said hub and including blocking means adapted in one of its positions permitted by said lost motion connection to block the path of axial shifting movement of said movable clutch element and, in another of such positions, to allow the movable clutch element to complete its axial shifting movement, and resilient means interposed between said hub and said synchronizer ring, adapted to lightly maintain said synchronizer ring in frictional engagement with the friction face of said driving member, whereby to normally maintain said synchronizer ring biased in blocking relation to said movable clutch element, so that engagement of the latter with said blocking means during the initial stage of shifting movement, serves to transmit axial thrust from the movable clutch element to the synchronizer ring for effecting synchronizing engagement between said friction clutch faces.

23. In a synchronizing transmission, a pair of aligned torque-transmitting shafts, an axially fixed hub secured to one of said shafts, said hub having an axially extending annular depression forming a rim, a jaw clutch element encircling said rim, drivingly connected thereto, and axially movable thereon, a jaw clutch element drivingly associated with the other shaft and adapted to be engaged by said movable jaw clutch element when the latter is shifted axially, thus to establish a positive drive connection between said shafts, a friction clutch element drivingly associated with said other shaft, a synchronizer ring received in the annular depression in the hub, said ring having a friction clutch face for coaction with said friction clutch element, having a lost motion driving connection with the hub, and including blocking means adapted, in one of its positions permitted by said lost motion connection, to block the path of axial shifting movement of said movable clutch element, and, in another of such positions, to allow the movable clutch element to complete its axial shifting movement, and means for causing said synchronizer element to continuously receive a slight amount of torque from said other shaft so as to normally maintain said synchronizer element biased in blocking relation to said movable clutch element, whereby engagement of the latter with said blocking means during the initial stage of shifting movement, serves to transmit axial thrust from the movable clutch element to the synchronizer element for effecting synchronization.

24. In a synchronizing transmission, a pair of aligned torque-transmitting shafts, an axially fixed hub secured to one of said shafts, said hub having an axially extending annular depression forming a rim, a jaw clutch element encircling said rim, drivingly connected thereto, and axially movable thereon, a jaw clutch element drivingly associated with the other shaft and adapted to be engaged by said movable jaw clutch element when the latter is shifted axially, thus to establish a positive drive connection between said shafts, a friction clutch element drivingly associated with said other shaft, a synchronizer ring received in the annular depression in the hub, said ring having a friction clutch face for coaction with said friction clutch element, having a lost motion driving connection with the hub, and including blocking means adapted, in one of its positions permitted by said lost motion connection, to block the path of axial shifting movement of said movable clutch element, and, in another of such positions, to allow the movable clutch element to complete its axial shifting movement, and means for maintaining said synchronizer element in constant light frictional engagement with said other friction clutch element so as to normally maintain said synchronizer element biased in blocking relation to said movable clutch element, whereby engagement of the latter with said blocking means during the initial stage of shifting movement serves to transmit axial thrust from the movable clutch element to the synchronizer element for effecting synchronization.

25. In a synchronizing transmission, a pair of torque-transmitting members mounted in axial alignment, a hub carried by one of said members, means for fixing said hub against movement axially of said one member, a movable jaw clutch element carried by said hub and adapted to be moved axially into engagement with a jaw clutch element carried by the other member thus to establish a positive drive connection between said members, a synchronizer element driven by said one member and adapted to be moved axially into frictional driving engagement with a friction clutch element carried by said other member so as to effect synchronization of said members, and an annular thrust member of spring material arranged coaxially with said torque-transmitting members, having an axial thrust-transmitting connection with said synchronizer element and being biased under compression in radially outwardly directed yielding engagement with the interior of said movable clutch element, whereby to transmit axial movement from said movable clutch element to said synchronizer element.

26. In a synchronizing mechanism, two relatively rotatable parts to be clutched one having a set of clutch teeth and a friction clutching member rotating therewith and the other having a friction clutching element rotating therewith and adapted for displacement to engage the friction clutching member, the last said part having external splines, a hollow shift sleeve having at least a portion of its interior surface splined for sliding fit with said external splines, and a radially expanding ring frictionally engaging said shift sleeve for shift therewith to effect said displacement of said friction clutching element and accommodate further shift of said shift sleeve to clutch the latter with said set of clutch teeth.

27. In a synchronizing clutch mechanism for automotive change speed transmissions, relatively rotatable shafts to be clutched, positively engageable clutch elements respectively driven with said shafts, a friction cup clutching member driven with one of said shafts, a friction cone clutching member driven with the other of said shafts, means for forcing one of said friction clutching members against the other to synchronize said shafts and for subsequently shifting one of said positive clutch elements into engagement with the other, said friction cup clutching member having its friction surface threaded, said threads being of suitable pitch and in number approximately forty per inch to present a relatively small friction surface area capable of substantially instantaneously cutting through the oil film between the friction surfaces of said members and thereby provide relatively high unit pressure of engagement of said friction members affording substantially instantaneous synchronization of said shafts and minimization of wear of the engaging friction surfaces of said friction clutching members.

28. A transmission as defined in claim 25, wherein said annular thrust member is adapted to yield axially with respect to said movable clutch element during shifting of the latter, but remains at all times in engagement with the interior thereof.

29. In a synchronizing transmission, a pair of torque-transmitting members mounted in axial alignment, a hub having external teeth, means for mounting said hub on one of said members for rotation therewith but preventing movement of said hub axially, a movable jaw clutch element having internal teeth whereby it is splined in encircling relationship upon the external teeth of said hub, and adapted to be moved axially to bring said teeth into clutching engagement with cooperating jaw clutch teeth on the other member, thus to establish a positive drive connection between said members, a synchronizer element driven by said one member, having an internal friction clutch face, and adapted to be moved axially into frictional driving engagement with a cooperating clutch face on said other member so as to effect synchronization of said members, and an annular thrust member of spring material arranged coaxially with said torque-transmitting members, having an axial thrust transmitting connection with said synchronizer element and being biased under compression in radially outwardly directed yielding engagement with the inner faces of the teeth of said movable clutch element, whereby to transmit axial movement from said movable clutch element to said synchronizer element.

30. A transmission as defined in claim 29, wherein said annular thrust member is adapted to yield axially with respect to said movable clutch element during shifting of the latter, but remains at all times in engagement with the interior of the teeth of said movable clutch element.

31. In a synchronizing transmission, a pair of torque-transmitting members mounted in axial alignment, a hub having external teeth, means for mounting said hub on one of said members for rotation therewith but preventing movement of said hub axially, a movable jaw clutch element having internal teeth whereby it is splined in encircling relationship upon the external teeth of said hub, and adapted to be moved axially to bring said teeth into clutching engagement with cooperating jaw clutch teeth on the other member, thus to establish a positive drive connection between said members, a synchronizer element driven by said one member, having an internal friction clutch face, and adapted to be moved axially into frictional driving engagement with a cooperating clutch face on said other member so as to effect synchronization of said members, and a split ring of spring material arranged coaxially with said torque-transmitting members, having an axial thrust transmitting connection with said synchronizer element and being biased under compression in radially outwardly directed yielding engagement with the inner faces of the teeth of said movable clutch element, whereby to transmit axial movement from said movable clutch element to said synchronizer element.

32. A synchronizing transmission as defined in claim 22, wherein the hub is axially fixed and the synchronizer ring is axially movable relative to said hub.

33. In a synchronizing transmission, a pair of aligned torque-transmitting shafts, an axially fixed hub secured to one of said shafts, said hub having an axially extending annular depression forming a rim, a jaw clutch element encircling said rim, drivingly connected thereto, and axially movable thereon, a jaw clutch element drivingly associated with the other shaft and adapted to be engaged by said movable jaw clutch element when the latter is shifted axially, thus to establish a positive drive connection between said shafts, a friction clutch element drivingly associated with said other shaft, a synchronizer ring received in the annular depression in the hub, said ring having a friction clutch face for coaction with said friction clutch element, having a lost motion driving connection with the hub, and including blocking means adapted, in one of its positions permitted by said lost motion connection, to block the path of axial shifting movement of said movable clutch element, and, in another of such positions, to allow the movable clutch element to complete its axial shifting movement, and means for maintaining said synchronizer element in constant light frictional engagement with said other friction clutch element so as to normally maintain said synchronizer element biased in blocking relation to said movable clutch element, whereby engagement of the latter with said blocking means during the initial stage of shifting movement serves to transmit axial thrust from the movable clutch element to the synchronizer element for effecting synchronization, said last means constituting the sole means for establishing the blocking relation.

34. In a synchronizing transmission, a pair of aligned torque transmitting shafts, an axially fixed hub secured to one of said shafts, said hub having a rim forming an axially opening annular depression, a jaw clutch sleeve encircling said rim, splined thereon, and axially shiftable into positive clutching engagement with a jaw clutch element drivingly associated with the other shaft, a friction clutch element drivingly associated with said other shaft, a synchronizer ring, partially received in said annular depression, having a friction clutch face for coaction with said friction clutch element, having a lost motion circumferentially oscillatable driving connection with said hub, and including blocking means adapted, in one of its positions permitted by said lost motion connection, to be engaged by said sleeve when the latter is shifted axially so as to receive axial thrust therefrom for effecting synchronization, adapted, when thus engaged, to block further axial advance of said sleeve, and adapted, in another of such positions, to allow the said sleeve to complete its axial shifting movement, said synchronizer ring being arranged to normally maintain a constant light frictional engagement with said coacting friction clutch element and to be thereby maintained in its blocking position, said constant light frictional engagement constituting the sole means for insuring the initiation of synchronization under all conditions.

35. In a synchronizing transmission, a hub, a pair of axially spaced torque transmitting members between which said hub is mounted in axial alignment therewith, a movable jaw clutch sleeve encircling said hub, drivingly connected thereto, and axially shiftable thereon into positive clutching engagement with positive clutch elements drivingly associated with the respective torque transmitting members, thereby to establish a positive drive connection between said hub and either of said members, a pair of synchronizer elements each having a lost motion driving connection with said hub and including blocking means adapted in one of its positions permitted by said lost motion connection, to block the path of axial shifting movement of said movable jaw clutch sleeve and, in another of such positions, to allow the movable jaw clutch sleeve to complete its axial shifting movement, said synchronizer elements each having a friction clutch face associated with a coacting friction clutch element drivingly associated with an adjacent torque transmitting member and adapted to be urged into frictional driving engagement therewith by axial pressure derived through the blocking engagement of said blocking means and movable jaw clutch sleeve, whereby to effect synchronization between said hub and the corresponding torque transmitting member, and means for causing the synchronizer elements to constantly receive torque from their coacting friction clutch elements and to thereby be biased in their blocking positions so as to insure initiation of synchronization, said means comprising an axially yieldable elongated element disposed in the hub and having its ends engaged under compression against the respective synchronizer elements.

36. In a synchronizing transmission, a hub, a pair of axially spaced torque transmitting members between which said hub is mounted in axial alignment therewith, a movable jaw clutch sleeve encircling said hub, drivingly connected thereto, and axially shiftable thereon into positive clutching engagement with positive clutch elements drivingly associated with the respective torque transmitting members, thereby to establish a positive drive connection between said hub and either of said members, a pair of synchronizer elements each having a lost motion driving connection with said hub and including blocking means adapted in one of its positions permitted by said lost motion connection, to block the path of axial shifting movement of said movable jaw clutch sleeve and, in another of such positions, to allow the movable jaw clutch sleeve to complete its axial shifting movement, said synchronizer elements each having a friction clutch face associated with a coacting friction clutch element, drivingly associated with an adjacent torque transmitting member and adapted to be urged into frictional driving engagement therewith by axial pressure derived through the blocking engagement of said blocking means and movable jaw clutch sleeve, whereby to effect synchronization between said hub and the corresponding torque transmitting member, and means for causing the synchronizer elements to constantly receive torque from their coacting friction clutch elements and to thereby be biased in their blocking positions so as to insure initiation of synchronization, said means comprising an axially yieldable elongated element extending axially of the hub and having its ends engaged under compression against said synchronizer elements.

37. In a synchronizing mechanism, a shaft, a torque transmitting member to be synchronized therewith, said member having friction and jaw clutch elements rotating therewith, a hub separate from and mounted upon said shaft for rotation therewith, said hub having a rim defining an annular depression opening axially toward said torque transmitting member, said rim and said jaw clutch element having alignable peripheral teeth, a jaw clutch sleeve encircling said hub, having internal teeth meshing with the hub teeth, and shiftable axially into clutching engagement with the teeth of said positive clutch element, thus to establish a positive drive connection between said shaft and member, a synchronizer ring received in said annular depression, having a friction clutch face for coaction with said friction clutch element, adapted to have limited rotative movement relative to said hub and including peripheral blocker teeth adapted, in one of its positions of such movement, to be engaged by said internal teeth during shifting movement of the sleeve so as to receive axial thrust therefrom and to thereby establish synchronizing frictional engagement with said friction clutch element, and adapted in another of such positions to align with the hub teeth and thereby permit the sleeve to complete its axially shifting movement, said synchronizer ring being arranged to maintain a constant light frictional engagement with said friction clutch element and to be thereby normally maintained in its blocking position, said constant light frictional engagement constituting the sole means for insuring the initiation of synchronization under all conditions.

38. In a synchronizing mechanism, a shaft, a torque transmitting member to be synchronized therewith, said member having friction and jaw clutch elements rotating therewith, a hub separate from and mounted upon said shaft for rotation therewith, said hub and said jaw clutch element having alignable peripheral teeth, a jaw clutch sleeve encircling said hub, having internal teeth meshing with the hub teeth and shiftable axially into clutching engagement with the teeth of said jaw clutch element, thus to establish a positive drive connection between said shaft and member, a synchronizer ring confined between said hub and friction clutch element and having a friction clutch face of smaller diameter than the pitch diameter of said teeth, for coaction with said friction clutch element, adapted to have limited rotative movement relative to the hub and including peripheral blocker teeth adapted, in one of its positions of such movement, to be engaged by said internal teeth during shifting movement of the sleeve so as to receive axial thrust therefrom and to thereby establish synchronizing frictional engagement with said friction clutch element, and adapted in another of such positions to align with the hub teeth and thereby permit the sleeve to complete its axially shifting movement, said synchronizer ring being arranged to maintain a constant light frictional engagement with said friction clutch element and to be thereby normally maintained in its blocking position, said constant light frictional engagement constituting the sole means for insuring the initiation of synchronization under all conditions.

39. In a synchronizing mechanism, a pair of coaxial torque transmitting members to be synchronized, a hub separate from and axially fixed upon one of said members for rotation therewith, friction and jaw clutch elements drivingly associated with the other member, said hub and jaw clutch element having alignable peripheral teeth, a jaw clutch sleeve encircling said hub, having internal teeth meshing with the hub teeth, and shiftable thereon into engagement with the teeth of said jaw clutch element so as to establish a positive drive connection between said members, a synchronizer element confined between said hub and said other member, adapted to have limited rotative movement relative to said hub, including blocking means adapted, in one of its positions of such movement, to be engaged by said sleeve during shifting movement of the latter, to receive axial thrust therefrom, and under such thrust to establish synchronizing frictional engagement with said friction clutch element, adapted, when so engaged, to block axial advance of said sleeve, and adapted in another of such positions to allow said sleeve to complete its axially shifting movement, said synchronizing element being arranged to maintain a constant light frictional engagement with said friction clutch element and to be thereby normally maintained in its blocking position, said constant light frictional engagement constituting the sole means for insuring the initiation of synchronization under all conditions.

40. In a synchronizing mechanism, a pair of coaxial torque transmitting members to be synchronized, a hub separate from and axially fixed upon one of said members for rotation therewith, friction and jaw clutch elements drivingly associated with the other member, said hub and jaw clutch element having alignable peripheral teeth, a jaw clutch sleeve encircling said hub, having internal teeth meshing with the hub teeth, and shiftable thereon into engagement with the teeth of said jaw clutch element so as to establish a positive drive connection between said members, a synchronizer element confined between said hub and said other member, adapted to have limited rotative movement relative to said hub, including blocking means adapted, in one of its positions of such movement, to be engaged by said sleeve during shifting movement of the latter, to receive axial thrust therefrom, and under such thrust to establish synchronizing frictional engagement with said friction clutch element, adapted, when so engaged, to block axial advance of said sleeve, and adapted in another of such positions to allow said sleeve to complete its axially shifting movement, and yielding means acting constantly, except during the occurrence of reversals of the relative directions of rotation between said shafts, to cause said synchronizer ring to remain in its blocking position, said means constituting the sole means for insuring the initiation of synchronization under all conditions.

41. In a synchronizing mechanism for motor vehicle transmission, coaxial driving members each carrying a set of clutch teeth and a friction clutch element, means drivingly connecting said members for rotation at different speeds, a driven member adapted to selectively receive a drive from said driving members, a hub structure, means mounting said hub structure on said driven member for rotation therewith but preventing movement of said hub structure axially of said driven member, a shiftable sleeve splined upon said hub structure and having clutch teeth adapted to selectively clutch with said sets of clutch teeth, a synchronizing control structure disposed between each of said driving members and said hub structure, each of said control structures having a friction clutch part engageable with one of said friction clutch elements and a stop for controlling shift of said shift device, means drivingly connecting said control structures with said hub structure for accommodating axial and rotative movement of said control structures relative to said hub structure, and an expansion ring releasably engaging the interior of said shiftable sleeve so as to receive shifting thrust therefrom and adapted to transmit such thrust to either of said control structures selectively so as to effect selective engagement of said friction clutch parts respectively with said friction clutch elements, said expansion ring accommodating additional shift of said shift device relative to said control devices for effecting selective clutching of the clutch teeth of the shift device with said sets of clutch teeth.

42. In a synchronizing mechanism, two relatively rotatable co-axial parts to be clutched one having a set of clutch teeth and a friction clutching member rotating therewith and the other having a friction clutching element rotating therewith and adapted for displacement in the direction of said axis to engage the friction clutching member, said other part having external splines, means for fixing said other part against displacement in the direction of said axis, a hollow shift sleeve having at least a portion of its interior surface splined for sliding fit with said external splines, and a radially expanding ring operably associated with said friction clutching element and having releasable thrust-receiving engagement with the interior of said shift sleeve for shift therewith to effect said displacement of said friction clutching element and accommodate further shift of said shift sleeve to clutch the latter with said set of clutch teeth.

43. In a synchronizing transmission, a pair of aligned rotatable parts to be drivingly connected, jaw and friction clutch members drivingly associated with one of said parts, a hub element mounted upon the other part for rotation therewith but fixed against movement axially thereof, a jaw clutch sleeve encircling, drivingly connected to and axially shiftable upon the periphery of said hub element into positive clutching engagement with said jaw clutch members so as to establish a positive drive connection between said parts, a synchronizer element adapted under axial pressure to establish a synchronizing frictional driving connection with said friction clutch member, and including blocking means adapted as the result of frictional engagement between said synchronizer element and friction clutch member to be biased in a position blocking axial advance of said sleeve, said synchronizer element being provided with a lug and said hub element having a space into which said lug extends to form a lost motion circumferentially oscillatable and axially shiftable driving connection between said elements, and a thrust member in releasable thrust receiving engagement with the interior of said sleeve and adapted to engage said lug thereby to transmit to said synchronizer element the thrust received from said sleeve during shifting of the latter.

44. In a transmission synchronizer, a driven shaft, a driving member and hub having alignable peripheral clutch teeth, a friction clutch element carried by said driving member, means detachably mounting said hub on said shaft for rotation therewith in a position adjacent said driving member and fixed against axial movement, a jaw clutch sleeve carried by said hub, having internal teeth intermeshing with the hub teeth and shiftable axially thereon, a synchronizer ring floatingly confined between said hub and said driving member, having a friction clutch part for engagement with said friction clutch element, having peripheral blocker teeth, alignable with said hub teeth, and having a driving connection with said hub permitting axial shift of said synchronizer ring into frictional driving engagement with said friction clutch element and permitting rotatable shift of said synchronizer ring relative to said hub between a position wherein said blocker teeth are in blocking relation to the teeth of said sleeve and a position permitting said sleeve to advance to a position wherein its teeth establish clutching engagement with the clutch teeth of said driving member, and means releasably connecting said sleeve with said synchronizer ring for transmitting shifting movement from the sleeve to said ring in order to move the latter into engagement with said friction clutch element, said releasable connecting means accommodating said advance of said sleeve to said clutching position.

45. In a transmission synchronizer, a driven shaft, a driving member and hub having alignable peripheral clutch teeth, a friction clutch element carried by said driving member, means detachably mounting said hub on said shaft for rotation therewith in a position adjacent said driving member and fixed against axial movement, a jaw clutch sleeve carried by said hub, having internal teeth intermeshing with the hub teeth and shiftable axially thereon, a synchronizer ring disposed between said hub and driving member and having a friction clutch part, clearance being provided radially between said synchronizer ring and said hub and sleeve for free self-centering seating of the synchronizer ring on the driving member by engagement of said friction clutch part with said friction clutch element, said synchronizer ring having peripheral blocker teeth, alignable with said hub teeth, and having a driving connection with said hub permitting axial shift of said synchronizer ring into frictional driving engagement with said friction clutch element and permitting rotatable shift of said synchronizer ring relative to said hub between a position wherein said blocker teeth are in blocking relation to the teeth of said sleeve and a position permitting said sleeve to advance to a position wherein its teeth establish clutching engagement with the clutch teeth of said driving member, and means releasably connecting said sleeve with said synchronizer ring for transmitting shifting movement from the sleeve to said ring in order to move the latter into engagement with said friction clutch element, said releasable connecting means accommodating said advance of said sleeve to said clutching position.

46. In a synchronizing mechanism for motor vehicle transmissions, coaxial driving members each carrying a set of clutch teeth and a friction clutch element, means drivingly connecting said members together for rotation at different speeds, a driven member adapted to selectively receive a drive from said driving members, a hub structure mounted on said driven member for rotation therewith, a shift device driven with said hub structure and having clutch teeth adapted to selectively clutch with said sets of clutch teeth, a synchronizing control structure disposed between each of said driving members and said hub structure, each of said control structures having a friction clutch part engageable with one of said friction clutch elements and a stop for controlling shift of said shift device, means drivingly connecting said control structures with said hub structure for accommodating axial and rotative movements of said control structures relative to said hub structure, and means releasably engaging said shift device so as to receive thrust therefrom when said shift device is shifted and adapted to engage said control structures so as to transmit said thrust thereto to effect selective engagement of said friction clutch parts respectively with said friction clutch elements, said thrust transmitting means accommodating additional shift of said shift device relative to said control devices for effecting selective clutching of the clutch teeth of the shift device with said sets of clutch teeth.

47. In a synchronizing mechanism, a shaft, a torque transmitting member to be synchronized therewith, said member having friction and jaw clutch elements rotating therewith, a hub separate from and axially fixed upon said shaft for rotation therewith, said hub and said jaw clutch element having alignable peripheral teeth, a jaw clutch sleeve encircling said hub, having internal teeth meshing with the hub teeth and shiftable axially into clutching engagement with the teeth of said jaw clutch element, thus to establish a positive drive connection between said shaft and member, a synchronizer ring confined between said hub and friction clutch element and having a friction clutch face, of smaller diameter than the pitch diameter of said teeth, for coaction with said friction clutch element, adapted to have limited rotative and axial movement relative to the hub and including peripheral blocker teeth adapted, in one of its positions of such movement, to be engaged by said internal teeth during shifting movement of the sleeve so as to receive axial thrust therefrom and to thereby establish synchronizing frictional engagement with said friction clutch element, and adapted in another of such positions to align with the hub teeth and thereby permit the sleeve to complete its axially shifting movement, said synchronizer ring being arranged to maintain a constant light frictional engagement with said friction clutch element and to be thereby normally maintained in its blocking position, said constant light frictional engagement constituting the sole means for insuring the initiation of synchronization under all conditions.

48. In a synchronizing mechanism, a pair of coaxial torque transmitting members to be synchronized, a hub separate from and axially fixed upon one of said members for rotation therewith, friction and jaw clutch elements drivingly associated with the other member, said hub and jaw clutch element having alignable peripheral teeth, a jaw clutch sleeve encircling said hub, having internal teeth meshing with the hub teeth, and shiftable thereon into engagement with the teeth of said jaw clutch element so as to establish a positive drive connection between said members, a synchronizer element confined between said hub and said other member, adapted to have limited rotative movement relative to said hub, including blocking means adapted, in one of its positions of such movement, to be engaged by said sleeve during shifting movement of the latter, to receive axial thrust therefrom, and under such trust to establish synchronizing frictional engagement with said friction clutch element, adapted, when so engaged, to block axial advance of said sleeve, and adapted in another of such positions to allow said sleeve to complete its axially shifting movement, and yielding means constantly acting on said synchronizer ring to engage the friction face thereof under light pressure with said friction clutch element whereby to normally maintain said ring in blocking position.

49. In a synchronizing transmission, a driven shaft having a splined end portion, having means providing a shoulder spaced from said end portion and having a bearing portion intermediate said end portion and shoulder, a hub separate from said shaft and splined upon said end portion, means securing said hub against axial movement thereon, a second speed gear rotatably mounted on said bearing portion between said hub and said shoulder and having friction and jaw clutch elements rotating therewith, said hub and said jaw clutch element having alignable peripheral teeth, a jaw clutch sleeve encircling said hub, having internal teeth meshing with the hub teeth, and shiftable thereon into engagement with the teeth of said jaw clutch element so as to establish a positive drive connection between said members, a synchronizer element confined between said hub and said other member, adapted to have limited rotative movement relative to said hub, including blocking means adapted in one of its positions of such movement, to be engaged by said sleeve during shifting movement of the latter, to receive axial thrust therefrom, and under such thrust to establish synchronizing frictional engagement with said friction clutch element, adapted, when so engaged, to block axial advance of said sleeve, and adapted in another of such positions to allow said sleeve to complete its axially shifting movement, said synchronizing element being arranged to maintain a constant light frictional engagement with said friction clutch element and to be thereby normally maintained in its blocking position, said constant light frictional engagement constituting the sole means for insuring the initiation of synchronization under all conditions.

50. In a synchronizing mechanism, a pair of coaxial torque transmitting members to be synchronized, a hub separate from and mounted upon one of said members for rotation therewith, friction and jaw clutch elements drivingly associated with the other member, said hub and jaw clutch element having alignable peripheral teeth, a jaw clutch sleeve encircling said hub, having internal teeth meshing with the hub teeth, and shiftable thereon into engagement with the teeth of said jaw clutch element so as to establish a positive drive connection between said members, a synchronizer element confined between said hub and said other member, adapted to have limited rotative movement relative to said hub, including blocking means adapted, in one of its positions of such movement, to be engaged by said sleeve during shifting movement of the latter, to receive axial thrust therefrom, and under such thrust to establish synchronizing frictional engagement with said friction clutch element, adapted, when so engaged, to block axial advance of said sleeve, and adapted in another of such positions to allow said sleeve to complete its axially shifting movement, said synchronizing element being arranged to maintain a constant light frictional engagement with said friction clutch element and to be thereby normally maintained in its blocking position, said constant light frictional engagement constituting the sole means for insuring the initiation of synchronization under all conditions.

51. In a synchronizing mechanism for motor vehicle transmissions, coaxial driving members each carrying a set of clutch teeth and a friction clutch element, means drivingly connecting said members together for rotation at different speeds, a driven member adapted to selectively receive a drive from said driving members, a hub structure, means mounting said hub structure on said driven member for rotation therewith but preventing movement of said hub structure axially of said driven member, a shift device driven with said hub structure and having clutch teeth adapted to selectively clutch with said sets of clutch teeth, a synchronizing control structure disposed between each of said driving members and said hub structure, each of said control structures having a friction clutch part engageable with one of said friction clutch elements and a stop for controlling shift of said shift device, means drivingly connecting said control structures with said hub structure for accommodating axial and rotative movements of said control structures relative to said hub structure, and means releasably connecting said shift device with said control structures for selective shift of said control structures by said shift device to effect selective engagement of said friction clutch parts respectively with said friction clutch elements, said releasable connecting means accommodating additional shift of said shift device relative to said control devices for effecting selective clutching of the clutch teeth of the shift device with said sets of clutch teeth, the releasable connecting means comprising an expansion ring frictionally engaging said shift device for shift therewith in transmitting shifting movement from said shift device selectively to said control structures.

52. In a power transmitting mechanism according to claim 19, said spring being disposed between said blocker and said other structure.

53. In a power transmitting mechanism including rotatable driving and driven structures adapted to be positively clutched, one of said structures carrying a set of clutch teeth and a frustoconical friction surface, the other of said structures being fixed against movement axially thereof and having teeth formed externally thereon, a clutch sleeve encircling said other structure and having teeth formed internally thereon for engagement with said external teeth such that said clutching sleeve is shiftable axially relative to said other structure to clutch said internal teeth with said set of clutch teeth, the teeth of said sleeve being axially spaced from said set of clutch teeth prior to clutching shift of said sleeve, a blocker ring disposed between said driving and driven structures and having a frustoconical friction part, clearance being provided radially between said blocker ring and said sleeve and said other structure thereby to accommodate free self-centering seating of said blocker ring on said one structure by engagement of said friction part with said friction surface, said blocker ring having blocker means adapted to control said clutching shift of said sleeve and having a driving connection with said other structure permitting rotatable shift of said blocker ring relative to said other structure between a position wherein said blocker means blocks said clutching shift of said sleeve and a position permitting said clutching shift of said sleeve.

54. In a power transmission mechanism according to claim 53 wherein said frusto-conical friction part comprises a threaded surface.

55. In a transmission synchronizer, a pair of coaxial torque transmitting members to be synchronized, a hub axially fixed upon one of said members, a jaw clutch sleeve encircling said hub, drivingly associated therewith and shiftable axially into positive clutching engagement with a jaw clutch element drivingly associated with the other member, thus to establish a positive drive connection between said members, a synchronizer ring adapted under axial pressure to establish a synchronizing frictional drive connection between said hub and a friction clutch element drivingly associated with said other member, and a thrust element disposed between said sleeve and said hub, radially outwardly of the friction surface of said synchronizer ring, adapted to yieldingly receive axial thrust from said sleeve and arranged to transmit such thrust directly to said synchronizer ring.

56. In a synchronizing mechanism the combination of a pair of relatively rotatable structures each having a friction clutch member and a set of clutch teeth, shiftable teeth adapted for shift to selectively clutch with said sets of clutch teeth, a pair of blocker members respectively associated with said structures and movable relatively to said shiftable teeth for blocking and allowing said clutching shift of said shiftable teeth, each of said blocker members having a friction part engageable with the friction clutch member of the structure associated therewith thereby to effect said movement of said blocker members, and spring means acting between said blocker members so as to bias said friction parts into continuous frictional engagement with said friction clutch members respectively.

OTTO E. FISHBURN.